(12) United States Patent
Takahashi

(10) Patent No.: US 7,333,679 B2
(45) Date of Patent: Feb. 19, 2008

(54) THERMOPHOTOMETRIC PHASE SHIFTER AND METHOD FOR FABRICATING THE SAME

(75) Inventor: Morio Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 5 days.

(21) Appl. No.: 10/516,821

(22) PCT Filed: Jun. 27, 2003

(86) PCT No.: PCT/JP03/08245

§ 371 (c)(1),
(2), (4) Date: Dec. 7, 2004

(87) PCT Pub. No.: WO2004/003639

PCT Pub. Date: Jan. 8, 2004

(65) Prior Publication Data

US 2005/0169566 A1    Aug. 4, 2005

(30) Foreign Application Priority Data

Jun. 28, 2002  (JP) .............................. 2002-190531

(51) Int. Cl.
*G02F 1/01* (2006.01)
(52) U.S. Cl. ......................................................... 385/1
(58) Field of Classification Search .................... None
See application file for complete search history.

(56) References Cited

U.S. PATENT DOCUMENTS 5,396,066 A * 3/1995 Ikeda et al. .................. 250/306

6,031,957 A * 2/2000 Suzuki et al. ................ 385/129

FOREIGN PATENT DOCUMENTS

| JP | 62-187826 | 8/1987 |
|----|-----------|--------|
| JP | 1-158413  | 6/1989 |
| JP | 01-158413 | 6/1989 |
| JP | 5-34525   | 2/1993 |

(Continued)

OTHER PUBLICATIONS

Y. Hashizume et al., "Polymer-assisted silica-based thermo-optic switch", NTT Photonics Laboratories, NTT Corporation, Electron. Lett., 33, pp. 194501946, 1997 (2001).

Y. Hashizume et al., "PLC-type Variable Optical Attenuator with low polarization dependent loss", NTT Photonics Laboratories, PTL, vol. 4, No. 1, pp. 36-38, Jan. 1992.

(Continued)

*Primary Examiner*—Sung Pak
*Assistant Examiner*—Hoang Tran
(74) *Attorney, Agent, or Firm*—Young & Thompson

(57) ABSTRACT

In an aspect of the present invention, a thermo-optic phase shifter includes a substrate, a heater, a clad layer formed directly or indirectly on a substrate, an optical waveguide clad layer formed apart from the substrate and the clad layer in a portion corresponding to the heater, and a core layer provided inside said bridge section clad layer. The optical waveguide clad layer is connected with the clad layer in a portion of the phase shifter other than the heater corresponding portion. The optical waveguide clad layer and the core layer form an optical waveguide in the heater corresponding portion. The heater is provided inside or outside the optical waveguide apart from the core layer in the heater corresponding portion, and generates heat to change a phase of a light signal propagated in the optical waveguide.

35 Claims, 19 Drawing Sheets

FOREIGN PATENT DOCUMENTS

| | | |
|---|---|---|
| JP | 6-148536 | 5/1994 |
| JP | 08-328049 | 12/1996 |
| JP | 9-5653 | 1/1997 |
| JP | 2848144 | 5/1997 |
| JP | 09-304664 | 11/1997 |
| JP | 11-109157 | 4/1999 |
| JP | 3152182 | 4/1999 |
| JP | 11-201984 | 7/1999 |
| JP | 3204493 | 10/1999 |
| JP | 2001-222034 | 8/2001 |
| JP | 2001-255474 | 9/2001 |

OTHER PUBLICATIONS

Y. Hida et al., Polymer Waveguide Thermooptic Switch with Low Electric Power Consumption at 1.3 µm, IEEE Photonics Technology Letters, Vo. 5, No. 7, Jul. 1993.

M. Horino et al., "Development of Prototype Micromechanical Optical Switch", JSME International Journal, Series C, vol. 41, No. 4, 1998.

T. Kanie et al., "PLC 2×2", Sumitomo Electric Industries, Ltd., J. Microelectromechanical System, vol. 6, pp. 277-285, 1997.

Q. Lai et al., "Low-Power Compact 2 ×2 Thermooptic Silica-on-Silicon Waveguide Switch with Fast Response", IEEE Photonics Technology Letters, vol. 10, No. 5, May 1998.

S. Shoma et al., "Low switching powers silica-based 1.5% delta thermooptic switch with heat insulating trenches", NTT Photonics Laboratories, 2002.

A. Sugita et al., "Bridge-Suspended Silica-Waveguide Thermo-Optic Phase Shifter and Its Application to Mach-Zehnder Type Optical Switch", The Transactions of the IEICE, vol. E 73, No. 1, Jan. 1990.

Horino M. et al., Development of Prototype Micromechanical Optical Switch, JSME International Journal, Ser.C., vol. 41, No. 4, 1998, pp. 978.

* cited by examiner

THERMOPHOTOMETRIC PHASE SHIFTER AND METHOD FOR FABRICATING THE SAME

TECHNICAL FIELD

The present invention relates to a thermo-optic phase shifter with electric power consumption reduced and a manufacturing method of the same.

BACKGROUND ART

In an optical communication field, a multi channel communication is rapidly promoted by the advent of a WDM (wavelength division multiplexing) communication system. In accompaniment by this, optical elements of a number corresponding to the number of channels are needed in order to achieve a functional control of each channel, for instance, controlling power of each channel to a constant power and controlling of switching.

For this reason, small-sized optical circuit parts are highly needed that can be applied to optical switches and enables a high-density integration. A light switch of a single unit has already been practiced. A matrix switch has been practiced in which the large number of these light switches is used and which has a plurality input-output ports. Various techniques are proposed to achieve the light switch as follows: that is, a method of connecting an input port and an output port by mechanically moving them (for instance, Japanese Laid Open Patent Application (JP-A-Heisei 9-5653)), a method of connecting an input port and an output port by rotating a movable mirror to have a predetermined angle (for instance, Japanese Laid Open Patent Application (JP-P2001-255474A), and Electronic Information Communication Academy convention proceedings C-3-8 (2002) p. 140), a method of using liquid crystal (For instance, Japanese Laid Open Patent Application (JP-A-Showa 62-187826)), a method of changing the connections between an input port and an output port by controlling reflection of light by means of generating bubbles in intersection of waveguides, and the like.

Among these techniques, a plan light wave circuit (PLC) type device using a thermo-optic phase shifter is extremely excellent in easiness of manufacturing and integration, and has a feature of advantage for high level functioning and high-density integration because manufacturing technique of a semiconductor circuit can be used for its manufacturing process.

Generally, the thermo-optic phase shifter is manufactured in the following way. First, an optical waveguide consisting of a clad layer and a core layer is formed on a substrate. A metal film and the like are formed on this optical waveguide, and are processed to have a fine line shape along the optical waveguide. When electric power is externally supplied to this thin film, heat is generated by the electric resistance of the thin film to operate as a heater of the optical waveguide. The heat generated by the heater reaches the core layer through the clad layer of the optical waveguide. As a result, refractive index in a portion heated by the heater in the optical waveguide increases, and the effect waveguide length becomes long based on a change amount of the refractive index and a waveguide length, so that the phase of light in an output end is shifted. An amount of phase shift can be arbitrarily controlled by adjusting the electric power supplied to the heater. It should be noted that when the optical waveguide is formed of quartz glass, the refractive index temperature coefficient (dn/dT) of the quartz glass is about $1 \times 10^{-5}$ (/° C.).

One optical waveguide is separated into two optical waveguides in an input port, at least one of the two optical waveguides is connected to the thermo-optic phase shifter, and the two optical waveguides are combined in an output end again. As a result, a light switch is practiced. For instance, if the phases of light components propagated in the two optical waveguides are shifted mutually by a half wave length, the output in the output end is zero. Also, in case of no phase shift, the light is outputted as it is inputted. Thus, On/Off control of the output can be achieved.

However, when a plurality of thermo-optic phase shifters are provided in one optical circuit for multiple channels, the electric power consumption of the entire optical circuit increases extremely if each thermo-optic phase shifter consumes large electric power. For instance, when light with the wave length of 1550 nm is guided which is usually used for optical communication, the electric power of about 400 mW per a channel is necessary to shift the phase of light by a half wave length in the conventional thermo-optic phase shifter. Therefore, for instance, the electric power of 40*400 mW=16000 mW=16 W is needed in maximum to control the optical communication circuit with 40 channels, when a switch using the above-mentioned thermo-optic phase shifter is provided in every channel. The thermo-optic phase shifter having the electric power consumption of about 40 mW per a channel is reported in research stage. However, the electric power consumption is still too large for the requirement of high integration to the thermo-optic parts.

To reduce the electric power consumption of the thermo-optic phase shifter, a method of changing material for forming the optical waveguide into a material with large temperature coefficient of refractive index is proposed. For instance, a method of using polymer for the waveguide is proposed (for example, Japanese Patent No. 2,848,144, IEEE Photon. Technol. Lett. by Y. Hida et al. (Vol. 5 (1993) pp. 782-784), and The Electronic Information Communication Academy convention proceedings C-3-10 (2002) p. 142).

Moreover, the thermo-optic phase shifter is also proposed in which a groove is provided between the optical waveguides to prevent heat generated by the heater from being transferred externally (for instance, The Electronic Information Communication Academy convention proceedings C-3-61 (2001) p. 226, the Electronic Information Communication Academy convention proceedings C-3-64 (2001), p. 229, IEEE Photon. Technol. Lett. by Q. Lai et al. (Vol. 10 (1998) pp. 681-683)). According to these references, a desirable temperature increment quantity can be obtained with smaller electric powers by providing a groove.

In addition, a method of thickening a clad layer located under a core layer is also proposed to prevent heat generated by a heater from being transferred to a substrate. Moreover, a technique is disclosed in which the surface of a substrate under an optical waveguide is removed to have a bridge structure in the thermo-optic phase shifter formed on a silicon substrate, in order to prevent the heat originated by the heater from being transferred to the substrate (for instance, Japanese Laid Open Patent Application (JP-A-Heisei 1-158413), Japanese Laid Open Patent Application (JP-A-Heisei 5-34525), and Japanese Laid Open Patent Application (JP-P2001-222034A)). Furthermore, a technique is disclosed in which a part of a silicon substrate under an optical waveguide is left to form a pole for supporting the optical waveguide to the silicon substrate in the paper by A. Sugita et al. (Trans. IEICE, Vol. E73 (1990) pp. 105-109).

In addition, Japanese Patent No. 3,152,182 discloses the following technique. That is, a silicon thin film is selectively formed on a quartz substrate, and an under clad layer is formed to cover this silicon thin film. A core is formed above the silicon thin film on the under clad layer, and an over clad layer is formed to cover the core layer. Thus, the optical waveguide is formed, and a heater is formed on the optical waveguide. Then, grooves are formed to reach the silicon thin film so as to put the optical waveguide between the grooves and the silicon thin film is removed by using the grooves. Thus, a gap is formed between the optical waveguide and the quartz substrate to reduce the electric power consumption of the thermo-optic phase shifter.

However, the above-mentioned conventional techniques have the following problems. That is, when the optical waveguide is formed of polymer, film quality of the polymer is deteriorated because of the high hygroscopic property of the polymer so that the polymer absorbs the moisture during manufacturing and operation of the thermo-optic phase shifter. For this reason, the polymer optical waveguide has larger propagation loss of light, compared with the optical waveguide formed of quartz glass. Also, it is difficult to form a passivation protection film on the polymer optical waveguide. Therefore, the polymer optical waveguide has lower stability and inferiority in reliability, compared with the quartz glass optical waveguides. Moreover, a method of burying polymer partially in the quartz glass optical waveguide may be proposed. However, this method causes various problems such as complication of a manufacturing process, low reproducibility, and increase of propagation loss occurred in an interface of quartz glass and polymer.

Moreover, in the method of providing the grooves between the optical waveguide, it is possible to prevent that the heat from the heater provided directly on a certain optical waveguide conducts another adjacent optical waveguide. However, it is not possible to prevent heat from the heater from being transferred to the substrate. Thus, the effect to decrease the electric power consumption becomes small.

In addition, in the method of thickening the clad layer under the core layer, there is a problem that a crack generates with a stress generated in the clad layer during the film growth. Moreover, there is a problem of causing a bend of the substrate with the stress. Furthermore, an optical characteristic of the optical waveguide is deteriorated because of this stress. In addition, it is not suitable for mass production because the deposition time becomes long. Therefore, it is difficult to form the clad layer thick in the process.

In addition, in the technique of removing the surface of the silicon substrate under the optical waveguide, the strong acid such as fluorinated nitric acid is needed as etchant in order to etch the silicon substrate. The heater is protected by being covered with a resist layer in the etching of the silicon substrate. The resist layer cannot endure the fluorinated nitric acids and the heater receives damage through the etching. Thus, there is a problem in the process in the method of the etching of the silicon substrate. Moreover, the partial removal of the silicon substrate leads to weaken strength of the substrate itself for securing strength of the thermo-optic phase shifter. As a result, mechanical strength of elements is reduced. Also, the etching of the silicon substrate leads to an unstable state of the optical waveguide since the state of impression of the stress to the clad layer changes. As a result, mechanical strength and an optical characteristic of the clad layer of the optical waveguide are deteriorated. In addition, if a part of the silicon substrate is remained as a pole as described in the paper by A. Sugita et al. (Trans. IEICE Vol. E73 (1990) pp. 105-109), a thermal insulation effect to the optical waveguide is acutely deteriorated because silicon has high thermal conductivity. Thus, the original purpose of reducing power consumption cannot be accomplished.

Furthermore, in the technique disclosed in Japanese Patent No. 3,152,182, i.e., in which a silicon thin film is provided on the substrate selectively, and a gap is formed between the substrate and the optical waveguide by etching the silicon thin film in a subsequent process, it is a problem that the etching of the silicon thin film is still difficult. Moreover, the upper surface of an under clad layer does not become flat because the under clad layer is formed to cover the silicon thin film. Thus, there is a problem that it is difficult to form the core layer, an over clad layer, and a heater on the under clad layer.

In conjunction with the above description, a light switch and a manufacturing method of the same are disclosed in Japanese Laid Open Patent Application (JP-A-Heisei 6-148536). The conventional light switch has a movable member that is electrically conductive and elastically deformable is supported in the shape of cantilever. An electrode is provided adjacent to the movable material and drives between a first position and a second position with electrostatic force. A stop member stops the movable material at each position of the first position and the second position. A first optical waveguide is formed in the movable material. A second optical waveguide is optically coupled to the first optical waveguide when the movable material is in the first position. A third optical waveguide is optically coupled to the first optical waveguide when the movable material is in the second position.

Also, a semiconductor mechanics sensor and a manufacturing method of the same are disclosed in Japanese Laid Open Patent Application (JP-A-Heisei 11-201984). The conventional semiconductor mechanics sensor includes a support substrate, a beam structure, a movable electrode and a fixed electrode. The beam structure is supported on the support substrate in an electrically insulated state from the support substrate and is formed of a semiconductor material to displace in accordance with a mechanics amount. The movable electrode is provided as a unitary body with the beam structure. The fixed electrode is supported on the support substrate in an electrically insulated state from the support substrate and is formed of the semiconductor material. The mechanical force that acts on the beam structure is detected based on the change in electrostatic capacitance between the movable electrode and the fixed electrode in accompaniment by the displacement of the beam structure. A signal output section is provided on the support substrate in an electrically insulated state from the support substrate. The signal output section and the fixed electrode are connected by a wiring film with an air bridge structure that is formed of polycrystalline semiconductor material.

Moreover, a manufacturing method of an optical waveguide with a phase adjustment function is disclosed in Japanese Patent No. 3,204,493. The conventional optical waveguide with the phase adjustment function includes a clad layer formed on a substrate, a core layer buried in the clad layer, and a phase adjustment heater provided above the core layer to adjust optical path length. In the method of manufacturing the optical waveguide with the phase adjustment function, a part of the substrate is removed by a mechanical process and a removal region is formed. A substrate with a thermal conductivity lower than the substrate is formed by a mechanical process to suit the removal region. Then, both of the substrates are combined as a unitary body and a composite substrate is formed. The optical waveguide that consists of the clad layer and the core layer is formed on the composite substrate. The phase adjustment heater is formed above the substrate with low thermal conductivity.

DISCLOSURE OF INVENTION

Therefore, an object of the present invention is to provide a thermo-optic phase shifter in which a manufacturing process is easy, optical characteristics, mechanical strength, stability and reliability are good, and power consumption is small.

In an aspect of the present invention, a thermo-optic phase shifter includes a substrate; a heater; a clad layer provided directly or indirectly on the substrate; a bridge section clad layer formed apart from the substrate and the clad layer in a portion corresponding to the heater; and a core layer provided inside the bridge section clad layer. The bridge section clad layer is connected with the clad layer in a portion of the phase shifter other than the heater corresponding portion, and the bridge section clad layer and the core layer form a bridge section optical waveguide in the heater corresponding portion. The heater is provided inside or outside the bridge section optical waveguide apart from the core layer in the heater corresponding portion, and generates heat to change a phase of a light signal propagated in the bridge section optical waveguide.

Here, it is desirable that the distance between the bridge section clad layer and the substrate is equal to or more than 4 μm.

The core layer, the clad layer and the bridge section clad layer are desirably formed of glass material containing quartz, it is desirable that the glass material of the core layer contains germanium, and it is desirable that the substrate is formed of glass material containing quartz or silicon.

Also, it is desirable that the clad layer is formed on the substrate through a sacrifice layer, and the sacrifice layer is formed of material with an etching rate larger than that of the substrate. Also, the sacrifice layer is desirably formed of material with a thermal conductivity smaller than that of the substrate. Also, it is desirable that the sacrifice layer is formed of glass material containing phosphor, and the clad layer is formed of glass material containing boron and phosphor.

Also, the clad layer may be formed directly on the substrate.

The heater may be provided on the bridge section clad layer, and the heater may be provided in the bridge section clad layer apart from the core layer. In this case, the heater may be provided under the core layer in the bridge section clad layer.

Also, the thermo-optic phase shifter may further include a supporting section provided in a part of a space between the bridge section optical waveguide and the substrate to support the bridge section clad layer. In this case, the width of a portion of the bridge section optical waveguide where the supporting section may be provided is wider than that of a portion of the bridge section optical waveguide where the supporting section is not provided. The supporting section is desirably formed of material with a thermal conductivity smaller than that of the substrate, and the supporting section is desirably formed of material of an etching rate larger than that of the substrate.

The supporting section may be formed of a same material as the clad layer. The supporting section may be continuously formed over a full length of the bridge section optical waveguide in a direction in which the core layer extends, or may be formed in the portion in a direction in which the core layer extends.

Also, the optical waveguide clad layer may have a width wider in ends of the heater corresponding portion than in a center of the heater corresponding portion.

Also, the thermo-optic phase shifter may further include an reinforcing beam provided in grooves between the clad layer and the optical waveguide clad layer on a way of the heater corresponding portion to support the optical waveguide by connecting the clad layer and the optical waveguide clad layer.

In another aspect of the present invention, a method of manufacturing a thermo-optic phase shifter, is achieved by forming a sacrifice layer on a substrate, the sacrifice layer having an etching rate larger than the substrate; by forming a underside clad layer to cover the sacrifice layer, the lower clad layer having an etching rate smaller than that of the sacrifice layer; by forming a core layer a predetermined portion on the lower clad layer; by forming an upper clad layer on the lower clad layer and the core layer; by forming a heater at a portion corresponding to the predetermined portion on the upper clad layer; by forming grooves at a portion corresponding to the predetermined portion on both sides of the heater to pass through the upper clad layer and the lower clad layer to the sacrifice layer; and by removing at least a portion of the sacrifice layer through the grooves.

In another aspect of the present invention, a method of manufacturing a thermo-optic phase shifter, is achieved by forming a sacrifice layer on a substrate, the sacrifice layer having an etching rate larger than that of the substrate; by forming a first lower clad layer to cover up the sacrifice layer, the first lower clad layer having an etching rate smaller than the sacrifice layer; by forming a heater in a predetermined portion on the first lower clad layer; by forming a second lower clad layer on the first lower clad layer, a lower clad layer having the lower first clad layer and the second lower clad layer; by forming a core layer in a portion corresponding to the predetermined portion on the second lower clad layer; by forming an upper clad layer on the lower clad layer and the core layer; by forming grooves on both sides of the heater in a portion corresponding to the predetermined portion to pass through the upper clad layer and the lower clad layer to the sacrifice layer; and by removing at least a portion of the sacrifice layer through the grooves.

Here, the removing may be achieved by removing the sacrifice layer to form a space between the lower clad layer and the substrate to connect the grooves with each other, or by removing the sacrifice layer to leave a portion for supporting the lower clad layer in a portion corresponding to the predetermined portion. It is desirable that the removing may include removing the sacrifice layer by using hydrofluoric acid solution or buffered hydrofluoric acid solution.

It is desirable that the film thickness of the sacrifice layer is equal to or more than 4 μm. Also, the forming a sacrifice layer, and the forming a lower clad layer or the forming a first lower clad layer may be continuously carried out.

Also, the forming an upper clad layer, the forming a core layer and the forming a lower clad layer may be carried out by an atmosphere chemical vapor deposition method or a plasma chemical vapor deposition method.

In the present invention, it is possible to change the phase of a light propagated in the optical waveguide by heating the optical waveguide by the heater. At this time, it is possible to restrain that the heat generated by the heater is transferred directly to the substrate through the clad layer, and thermal insulation between the optical waveguide and the substrate can be improved. In this way, the temperature of the optical waveguide can be efficiently increased with a little heat quantity. Also, the stress applied to the optical waveguide is reduced by separating the clad layer from the substrate by grooves and the degradation of the optical characteristic can be prevented. Moreover, the stress applied to the optical waveguide can be remarkably reduced because the optical waveguide is separated from the peripheral clad layer around by the grooves. The degradation of the optical characteristic due to the application of the stress can be restrained. As a result, the optical characteristic of the thermo-optic phase shifter is good and electric power consumption is largely reduced. Therefore, many thermo-optic phase shifters can be integrated in a large scale. Also, because polymer is not used, the stability and reliability are excellent and the manufacture is easy. Also, because there is no process for etching silicon with strong acid such as fluorinated nitric acid, the manufacture is easy.

Also, in the present invention, it is possible to restrain that the heat generated by the heater is transferred to the substrate directly through the clad layer. Therefore, the temperature of the optical waveguide can be efficiently increased in a little heat quantity.

Also, the sacrifice layer and the clad layer can be continuously formed and the manufacturing process can be largely simplified. As a result, it is possible to realize cost reduction in the manufacture and a high yield. It should be noted that by providing the sacrifice layer intermittently, the stress generated by the sacrifice layer can be sufficiently released and the high reliability and high repeatability of the film forming process can be realized.

Also, a supporting section may be provided in a part of the space for the part at the above crack and to support the clad layer to the said substrate in the groove. Thus, because the stress applied to the optical waveguide becomes small, the degradation of the optical characteristic can be prevented. Also, the strength of the optical waveguide can be secured and it is favorable to the high density integration.

Also, the supporting section may be formed from the sacrifice layer. Thus, the support section can be formed without providing a special process for the support section by stopping the etching process to the sacrifice layer on the way. Or, the supporting section may be formed of material with an etching rate smaller than that of the sacrifice layer. In this way, the support section can be formed in self-alignment, compared with a case that the etching of the sacrifice layer is stopped on the way so as to leave the supporting section. The control-ability of the manufacture and repeatability can be improved and the deviation in the shape of the support sections is small. Also, the consumption electric power of the thermo-optic phase shifter can be more reduced by manufacturing the supporting section by using material with small thermal conductivity.

Also, it is desirable that the thermal conductivity of the sacrifice layer is smaller than the thermal conductivity of the material of the substrate. Thus, it is possible to prevent that the heat generated by the heater is transferred to the substrate because the thermal conductivity of the sacrifice layer is small even if a part of the sacrifice layer is supposed to have been left in the region under the heater. The temperature of the optical waveguide can be efficiently increased in a little heat quantity. As a result, consumption electric power per one thermo-optic phase shifter is largely reduced and a large-scaled integration becomes possible.

Also, it is desirable that the sacrifice material is formed of glass material containing phosphor and a clad layer is formed of glass material containing boron and phosphor. Thus, the etching rate difference by use of BHF solution is sufficiently accomplished between the sacrifice layer and the clad layer. The clad layer is never degraded in the sacrifice layer removal process, and the high reliability of the manufacturing process and the good repeatability can be realized. Moreover, the thermo-optic phase shifter excellent in the optical characteristic and having a little propagation loss can be realized.

Also, the supporting section may be continuously formed over the full length in an extending direction of the core layer directly under the core layer. The support section functions as a support when the optical waveguide is used under the environment of strong mechanical vibration, and can prevent a trouble such as the break of the optical waveguide. Moreover, by making the thermal conductivity of the support section smaller than that of the substrate, the path by which the heat escapes from the heater to the substrate can be largely decreased, compared with a case that the substrate is used as a support as mentioned above in the conventional technique. Thus, the reduction of the electric power consumption becomes possible. Otherwise, the supporting section may be formed in a part in the extending direction of the core layer direct under the core layer. Thus, optical waveguide on which the heater is provided is separated from the clad layer to fully release the stress so that optical characteristic degradation can be restrained. Also, by supporting a portion of the optical waveguide from the side of the substrate, the mechanical strength can be secured. Moreover, because the portion other than the support section has high thermal insulation, electric power consumption can be largely reduced and the high density integration of the thermo-optic part becomes possible.

Also, it is desirable that the optical waveguide has the support beam provided to cross the grooves and to support the clad layer. Thus, the stress applied to the optical waveguide can be fully released and the strength of the optical waveguide is improved. Thus, the optical waveguide can be used under the environment of strong mechanical vibration. It should be noted that because the sacrifice layer under the support beam is removed although the electric power consumption increases a little by providing the support beam, the heat transfer from the optical waveguide to the substrate through the support beam is restrained and enough electric power consumption reduction effect is accomplished.

Also, it is desirable that the side surface of the substrate near the core layer and parallel to the extending direction of the core layer in the groove is curved to separate from the optical waveguide at the ends of the core layer. Thus, because the most mechanically weak portion in the root section of the optical waveguide like a bridge can be reinforced without changing the manufacturing process, the reliability of the thermo-optic phase shifter can be more improved.

Also, the heater may be provided on the surface of the clad layer. Thus, it is possible to prevent that the heat runs away directly to the substrate without contributing to the temperature increase of the optical waveguide and the heating efficiency of the optical waveguide can be improved. Also, the manufacturing process of the thermo-optic phase shifter can be simplified, resulting in a high yield.

Otherwise, the heater may be provided in the clad layer. Thus, it is possible to stabilize of the heater since the heater is not exposed to air. Also, the heater does not receive deformation and change in quality by the etching liquid during the manufacturing process and the thermo-optic phase shifter with high reliability can be manufactured.

Also, it is desirable that the core layer and the clad layer are formed of glass material containing quartz. Thus, the thermo-optic phase shifter having small propagation loss, and excellent in optical characteristic and reliability can be realized.

Also, it is desirable that the substrate is formed of glass material containing quartz or silicon. Thus, by using the silicon semiconductor process, the thermo-optic phase shifter of the present invention can be formed. The manufacture of a thermo-optic phase shifter is easy and it is possible to improve the reliability and the repeatability.

BEST MODE FOR CARRYING OUT THE INVENTION

Hereinafter, a thermo-optic phase shifter of the present invention will be described in detail with reference to the attached drawings.

Figure 1A:
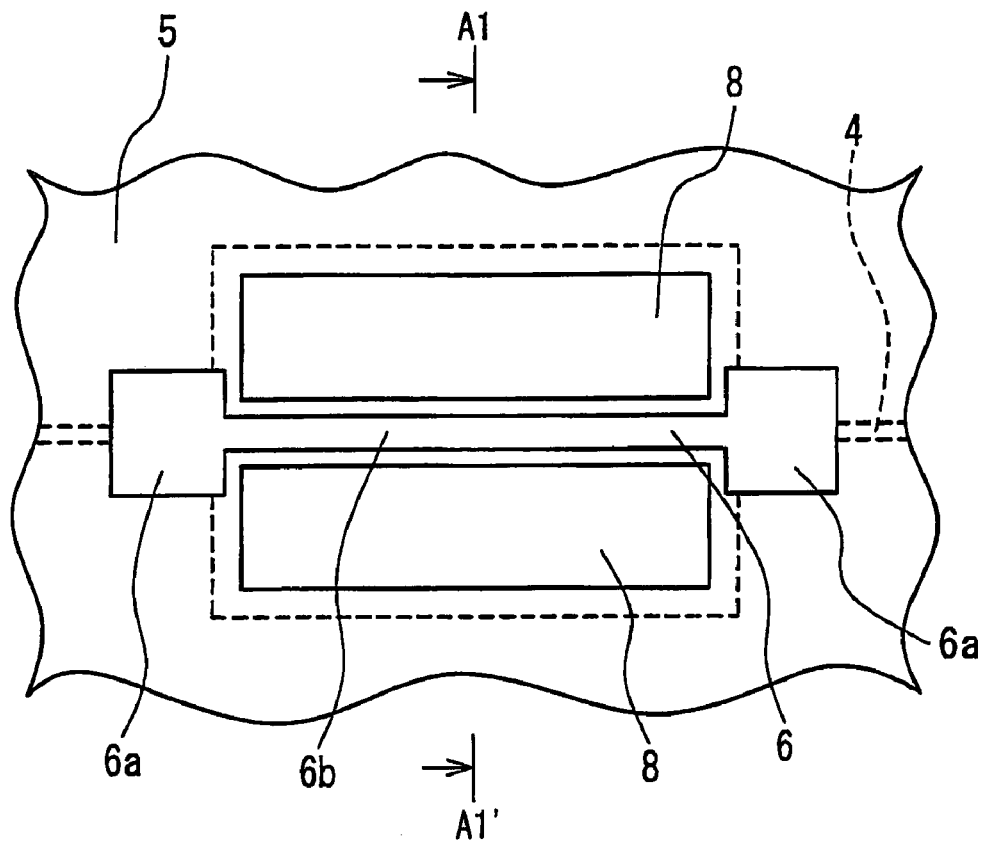
FIG. 1A is a plan view showing a thermo-optic phase shifter according to a first embodiment of the present invention.
Figure 1B:
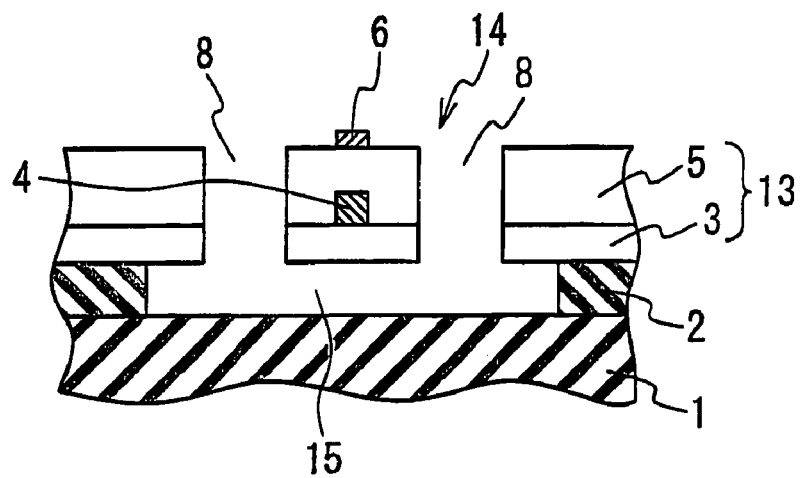
FIG. 1B is a cross sectional view of the thermo-optic phase shifter along the line A1-A1' shown in FIG. 1A.

First, the thermo-optic phase shifter according to a first embodiment of the present invention will be described. FIG. 1A is a plan view showing the thermo-optic phase shifter in the first embodiment and FIG. 1B is a cross sectional view of the thermo-optic phase shifter along the line A1-A1' shown in FIG. 1A. FIGS. 2A to 2D are cross sectional views of the thermo-optic phase shifter showing the manufacturing method of the thermo-optic phase shifter according to the first embodiment of the present invention. As shown in FIGS. 1A and 1B, the thermo-optic phase shifter in the first embodiment provides a substrate 1 of silicon of 0.8 mm in thickness, for example. A sacrifice layer 2 is provided on the substrate. The sacrifice layer 2 is formed by, for example, phosphor added silica glass (PSG), in which phosphorus is doped into the glass. The thickness of the film of the PSG is, for instance, 5 µm. A clad layer 13 is provided on the sacrifice layer 2. The clad layer 13 has a lower clad layer 3 provided on the sacrifice layer 2, and an upper clad layer 5 provided on the lower clad layer 3. The lower clad layer 3 and the upper clad layer 5 are formed of BPSG, in which boron and phosphorus are doped in the glass. The film thickness of the lower clad layer 3 and the upper clad layer 5 are 14 µm and 15 µm, respectively. It should be noted that the substrate 1 may be formed of a semiconductor or an insulator such as quartz glass other than silicon. Moreover, the sacrifice layer 2 is not limited to the PSG film and may be formed of another material if the etching rate of the material is larger than those of the substrate 1 and the clad layers 13, and a selection etching is possible for the substrate 1 and the clad layers 13. The sacrifice layer 2 may be formed of another glass other than the semiconductor or PSG as long as the above requirement is met.

A core layer 4 is provided on the lower clad layer 3 to extend in parallel to the surface of the substrate 1. The upper clad layer 5 is provided to cover the core layer 4. An optical waveguide 14 is formed from the core layer 4 and the clad layer 13 surrounding the core layer 4. The core layer 4 is preferable to be formed in straight but may be formed to have a curved shape. The cross sectional shape of the core layer 4 in an orthogonal direction to the longitudinal direction of the core layer 4 is, for example, a rectangle of 5 µm in height and 5.5 µm in width. Moreover, the core layer 4 is formed of material with a refractive index larger than that of the clad layer 13, for instance, GPSG (germanium and phosphor added silica glass). For instance, specific refraction index difference Δ of the core layer 4 and the clad layer 13 is 0.65%.

In addition, a thin film heater 6 is provided on the optical waveguide 14, that is, on the surface of the upper clad layer 5. The thin film heater 6 is formed of chromium and the thickness is 0.2 µm, for instance. The thin film heater 6 has an electrode section 6a at either end and a heater sections 6b between the electrode sections 6a. The shape of the electrode section 6a is, for instance, a square, and the shape of the heater section 6b is, for instance, a fine line of 4 mm in length and 10 µm in width.

Moreover, grooves 8 are formed on both sides of a portion of the clad layer 13 corresponding to the thin film heater 6 to extend in parallel to the direction of the core layer 4. That is to say, the grooves 8 are formed to put the optical waveguide 14 between them. The length of the groove 8 in the longitudinal direction, that is, the length of the core layer 4 in the extension direction is 4 mm for instance. The width of the groove 8, that is, the length of the groove 8 in the orthogonal direction to the longitudinal direction of the core layer 4 is, for example, 250 µm, and the depth of the groove 8 is, for instance, 29 µm. The distance between the grooves, that is, the width of the ridge of the optical waveguide 14 is, for example, 25 µm.

A space 15 is formed between the optical waveguide 14 and the substrate 1 by removing the sacrifice layer 2. The height of the space 15 is equal to the film thickness of the sacrifice layer 2, for instance, 5 µm. As a result, the optical waveguide 14 is separated from the clad layers 13, the sacrifice layers 2, and the substrates 1 other than the optical waveguide 14 by the two grooves 8 and the space 15 and forms a bridge suspended optical waveguide 14. It should be noted that the sacrifice layer 2 is formed on the whole surface of the substrate 1 except the space 15. Moreover, the groove 8 may be formed so as to reach the sacrifice layer 2.

Figure 2A:
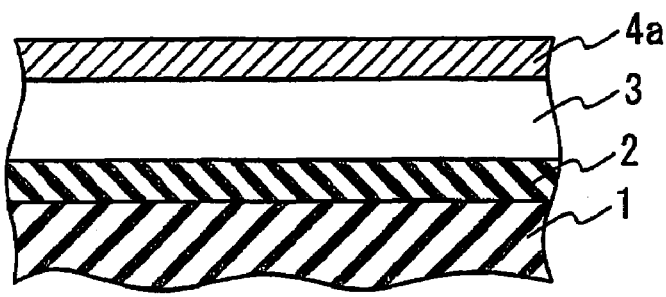
FIGS. 2A to 2D are cross sectional views of the thermo-optic phase shifter showing a manufacturing method of the thermo-optic phase shifter according to the first embodiment of the present invention.

Next, the method of the manufacturing the thermo-optic phase shifter in the first embodiment will be described. First, as shown in FIG. 2A, the sacrifice layer 2 is formed on the silicon substrate 1 having the thickness of 0.8 mm by an atmosphere pressure chemical vapor deposition method (AP-CVD), for example. The material of the sacrifice layer 2 is sufficient to have a selection etching property to the substrate 1 and the clad layer 13. For instance, the material of the sacrifice layer 2 may be a semiconductor or a glass and the like, and PSG is adopted in the embodiment. Moreover, the film thickness of the sacrifice layer 2 is 5 µm, for instance.

Next, the glass film having quartz as the main component such as a BPSG film is deposited by the AP-CVD method to have the thickness of 14 µm. Thus, the lower clad layer 3 is formed. A continuous deposition by the AP-CVD method is possible for the PSG of the sacrifice layer 2 and BPSG of the lower clad layer 3 by changing a doping element to be doped during the doping.

A thin film 4a is formed of material with a refractive index larger than that of the lower clad layer 3, on the lower clad layer 3. The thin film 4a is formed of GPSG (germanium and phosphor added silica glass) to which the mixing amount of germanium and phosphor is adjusted so that specific refraction rate difference Δ to the lower clad layer 3 is 0.65% for instance. The thin film 4a is formed by the AP-CVD method to have the thickness of is 5.5 µm, for instance.

Figure 2B:
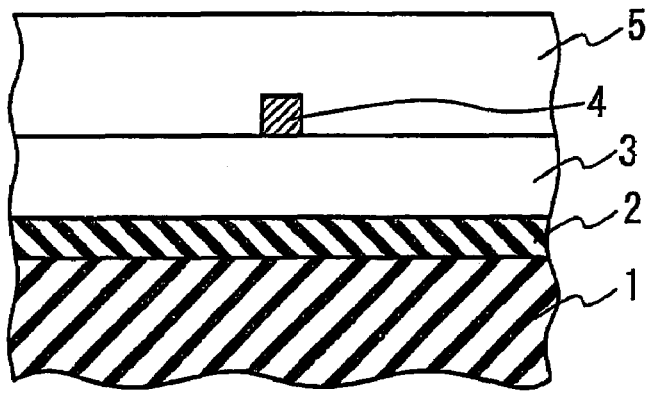

Next as shown in FIG. 2B, the patterning of the thin film 4a is carried out by a photolithography method and a reactive ion etching (RIE) method. Thus, the core layer 4 is formed to extend in parallel direction to the surface of the substrate 1, to have a rectangular cross section in a direction orthogonal to the parallel direction. The width of the core layer 4 is for instance 5.5 µm. Subsequently, the upper clad layer 5 of, for instance, BPSG is formed by the AP-CVD method to cover the core layer 4 and to have the thickness of, for instance, 15 µm. Thus, a buried type optical waveguide is formed.

Figure 2C:
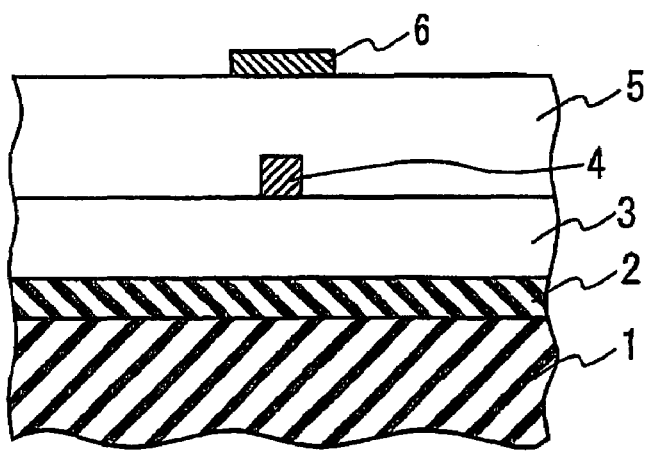

Next, as shown in FIG. 2C, a metal film such as a chromium film is formed straightly above the core layer 4 on the surface of the upper clad layer 5 by an electron-beam deposition method to have the thickness of 0.2 µm, for instance. Subsequently, the metal film is patterned to be a predetermined shape by a photolithography method and a wet etching method. Thus, a thin film heater 6 is formed.

Figure 2D:
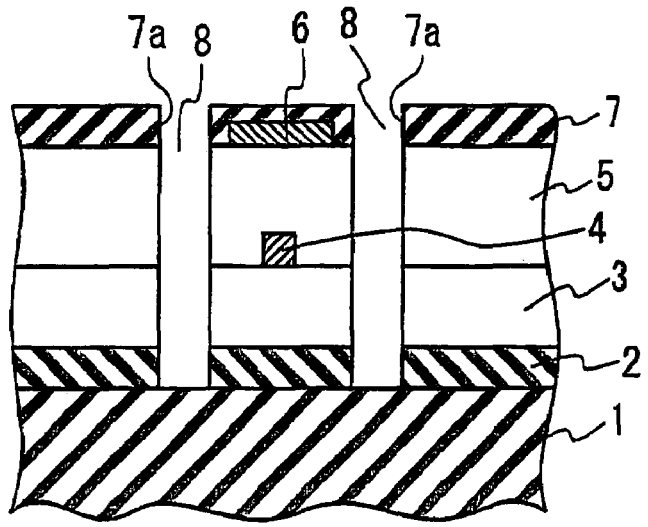

Next, as shown in FIG. 2D, a resist layer 7 is formed to cover the upper clad layer 5 and the thin film heater 6. Two openings 7a are formed in the resist layer 7 on the both sides of the thin film heater 6 by the photolithography method. The distance between the openings 7a is, for instance, 25 µm. Subsequently, the etching is carried out by the RIE using the resist layer 7 as a mask. The regions of the clad layer 13 and the sacrifice layer 2 corresponding to the both sides of the thin film heater 6 are selectively removed so as to form the grooves 8 in depth to reach the substrate 1.

Next, as shown in FIG. 1B, the wet etching of the sacrifice layer 2 is carried out with buffered hydrogen fluoride solution (BHF) is carried out through the groove 8 while the resist layer 7 remains to protect the thin film heater 6. Thus, the sacrifice layer 2 located under the bridge unit optical waveguide 14 is removed. As a result, the space 15 is formed in the region between the grooves 8, and between the substrate 1 and the clad layer 13. The height of the space 15 is equal to the film thickness of the sacrifice layer 2, and 5 µm in thick. At this time, when the buffered hydrogen fluoride solution (BHF) is used as an etchant, the etching rate to the PSG as the material of the sacrifice layer 2 is about 6 to 10 times of the etching rate to BPSG as the material of the clad layer 13. Also, the silicon as the material of the substrate 1 is hardly etched. Therefore, the PSG film functions as a sacrifice layer. Thus, the thermo-optic phase shifter of the embodiment is produced.

Next, an operation of the thermo-optic phase shifter in the first embodiment will be described. Power is supplied to the thin film heater 6 from an external power supply (not shown). As a result, the thin film heater 6 generates heat to increase the temperature of the optical waveguide 14, so that the refractive index of the optical waveguide 14 is changed. As a result, an effective length of the optical waveguide 14 is changed. Thus, a phase of the light inputted from an input end (not shown) to the optical waveguide 14 is changed at an output end (not shown).

In the first embodiment, the optical waveguide 14 is separated from the substrate and the clad layers 13 other than the optical waveguide 14. For this reason, it can be restrained that the generated heat from the thin film heater 6 is transferred or conducted to the substrate 1 and the clad layer 13, and the optical waveguide 14 can be efficiently heated.

It should be noted that the heat generated by the thin film heater 6 is somewhat conducted with the air filled in the groove 8, and the space 15 in the longitudinal direction of the clad layer 13 in the embodiment. However, the reduction of the calorie is extremely small in the structure of the thermo-optic phase shifter of the embodiment because the number of heat conduction paths is small. Therefore, the optical waveguide 14 can be efficiently heated. In this way, the electric power consumption in the driving of the thermo-optic phase shifter is extremely small.

Also, a thermal insulation of the optical waveguide 14 is improved by enlarging the distance between the substrate 1 and the optical waveguide 14, that is, the size of the space 15. Thus, the electric power consumption of the thermo-optic phase shifter decreases. The electric power consumption of the thermo-optic phase shifter can be reduced to the 20 mW or less, which is a half value of the conventional minimum electric power consumption 40 mW, by setting the height of the space 15, that is, the film thickness of the sacrifice layer 2 to 4 μm or more. Therefore, it is desirable that the space 15 is 4 μm or more in height.

In this embodiment, when light with the wavelength of 1550 nm is used as input light, electric power necessary for the phase shift of a half of the wave length is about 10 mW in an actual measurement. This is an extremely small value, which is 1/40 of the electric power consumption of the conventional thermo-optic phase shifter. That is to say, when a light switch with 40 channels is manufactured by using the thermo-optic phase shifter according to the embodiment, the light switch can be controlled in the electric power for one channel of the light switch in the conventional thermo-optic phase shifter method. Therefore, the miniaturization of an external package through the simplification of the power circuit and the like can be achieved, and a further miniaturization and integration of the device can be possible.

In the first embodiment, the stress applied from the substrate 1 and the clad layer 13 is small because the optical waveguide 14 is separated from the substrate 1 and the clad layer 13. Also, the stress applied from the sacrifice layer 2 to the optical waveguide 14 is small because the thickness of the sacrifice layer 2 is as thin as about 5 μm. In addition, the stress applied from the substrate 1 to the optical waveguide 14 is not changed irrespective of the etching so that the substrate 1 does not become weak, because the substrate 1 is not etched. Furthermore, the surface of the lower clad layer 3 becomes smooth because the sacrifice layer 2 has been formed on the substrate 1 to cover the whole surface of the substrate 1 at the time of the forming of the lower clad layer 3. Therefore, the core layer 4 can be formed on this smooth surface. As a result, in the thermo-optic phase shifter of the embodiment, polarization dependence on the stress is low, and the mechanical strength is high in addition to an excellent optical characteristic. Moreover, heat endurance is high and stability and reliability are high in the thermo-optic phase shifter of the embodiment because polymer is not used as its material.

It has been confirmed that the thermo-optic phase shifter of the embodiment has never inferior in any optical characteristic to the conventional thermo-optic phase shifter, and the break due to thermal stress never occurs and mechanical strength is maintained even if the thermo-optic phase shifter is heated up to the temperature to accomplish an amount of phase shift corresponding to three times of the wave length (supplied power is about 60 mW).

In addition, it is not necessary to use strong acid such as fluorinated nitric acids as an etchant because the etching process of silicon does not exist in the embodiment. Moreover, as mentioned above, any step is not formed on the surface of the lower clad layer 3, and the surface is flat because the sacrifice layer 2 is formed on the whole surface of the substrate 1. Moreover, it is possible to use the resist layer 7, which is provided to form the grooves 8, as an overcoat of the thin film heater 6 as it is, after forming the grooves 8. As a result, there is no need to newly form a resist layer after the grooves 8 are formed. Moreover, there is also no restriction to annealing because polymer is not used as the material of the thermo-optic phase shifter. Therefore, manufacturing of the thermo-optic phase shifter in the embodiment is easy. There is few difference in the manufacturing method of the thermo-optic phase shifter in the embodiment from the conventional manufacturing method of the thermo-optic phase shifter, and there is no need to introduce a new etching device and the like. Moreover, there is no process with a high load causing a decrease in yield, and it is possible to be applied to any optical waveguides easily.

Figure 3A:
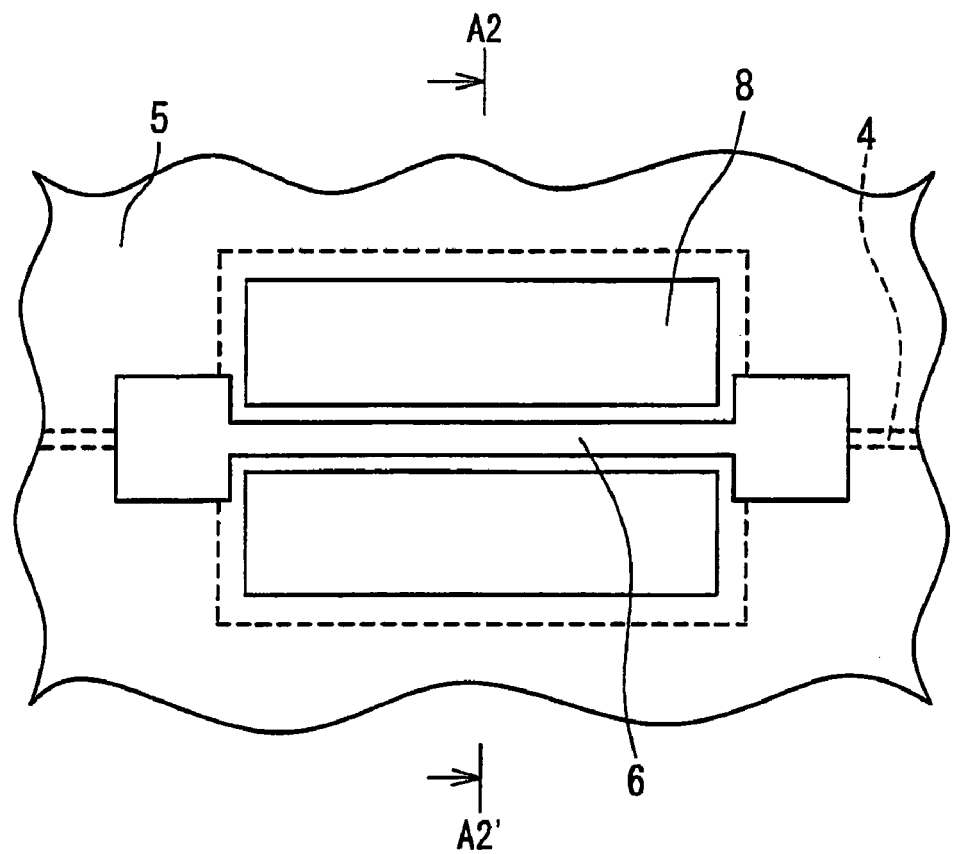
FIG. 3A is a plan view showing the thermo-optic phase shifter according to a second embodiment of the present invention.
Figure 3B:
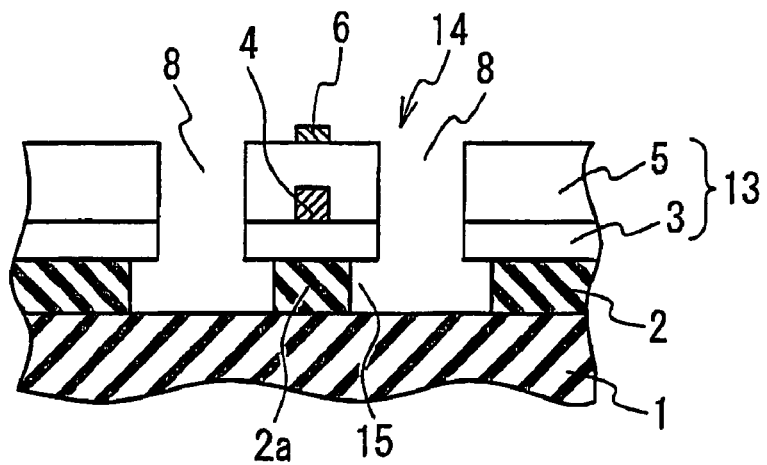
FIG. 3B is a cross sectional view of the thermo-optic phase shifter along the line A2-A2' shown in FIG. 3A.

Next, the thermo-optic phase shifter according to the second embodiment of the present invention will be described. FIG. 3A is a plan view showing the thermo-optic phase shifter in the second embodiment, and FIG. 3B is a cross sectional view of the thermo-optic phase shifter along the line A2-A2' shown in FIG. 3A. The structure and manufacturing method of the optical waveguide 14, the thin film heater 6, and the grooves 8 in the second embodiment are substantially the same as those of the above-mentioned first embodiment. Accordingly, detailed description of them is omitted. In the first embodiment, the sacrifice layer 2 under the thin film heater 6 is etched and removed completely. However, in the second embodiment, a part of the sacrifice layer 2 is remained to form a pole 2a. The width of the remained sacrifice layer 2 (pole 2a) can be adjusted based on an etching time.

When the thermo-optic phase shifter receives a mechanical stress such as extremely strong vibration and the like, the optical waveguide 14 has a possibility to be broken occasionally in the first embodiment, because the structure of the optical waveguide 14 in the first embodiment is similar to a suspension bridge. Also, even if the optical waveguide 14 is not destructed, there is a possibility that the optical waveguide 14 is bent to contact the substrate 1 or the clad layers 13 other than the optical waveguide 14. In this case, the thermal efficiency is decreased, and the electric power consumption can be increased. Japanese Laid Open Patent Application (JP-A-Heisei 1-158413) discloses a method of stopping an etching of the silicon substrate on the way to support the optical waveguide 14. However, if the pole is formed of the material with a high thermal conductivity such as silicon, a problem occurs that the electric power consumption increases remarkably. Thus, a trade-off exists between securing strength and decreasing of the electric power consumption. On the other hand, in the second embodiment, the sacrifice layer 2 is formed of PSG which has a low thermal conductivity. A part of the sacrifice layer 2 located right under the optical waveguide 14 is remained, to form the pole 2a. As a result, electric power consumption can be much more decreased, compared with a case where the pole is formed of silicon with the high thermal conductivity.

The electric power consumption of the thermo-optic phase shifter in the second embodiment is greatly dependent on the width of the sacrifice layer 2 to be remained, i.e., the width of the pole 2a. When the light with the wavelength of 1550 nm is inputted to the optical waveguide 14, the electric power consumption necessary to accomplish the phase shift for a half of the wavelength were actually measured. The result is that the electric power consumption is about 60 mW and about 120 mW when the width of the pole 2a is 5 µm and 10 µm, respectively. Therefore, the electric power consumption is decreased enough, comparing with the conventional thermo-optic phase shifter.

It should be noted that the optical waveguide 14 in the second embodiment needs 6 to 12 times of the electric power of the optical waveguide in the first embodiment which is completely separated from the substrate. However, the mechanical strength of the thermo-optic phase shifter in the second embodiment is much superior to that in the first embodiment. Therefore, it is preferable to select one of the thermo-optic phase shifter in the first embodiment and in the second embodiment according to the use purpose.

Next, the thermo-optic phase shifter according to the third embodiment of the present invention will be described. FIG. 4A to 4D are cross sectional views of the thermo-optic phase shifter in the manufacturing method according to the third embodiment of the present invention. FIG. 5A is a plan view showing the thermo-optic phase shifter in the third embodiment and FIG. 5B is a cross sectional view of the thermo-optic phase shifter along the line A3-A3' shown in FIG. 5A. In the first embodiment, the sacrifice layer 2 is formed on the whole surface of the substrate 1, and the sacrifice layer 2 and the lower clad layer 3 are successively formed. However, in the third embodiment, the sacrifice layer 2 is provided only in a region straightly under the thin film heater 6.

In the first embodiment, an extremely large stress is generated depending on the material of the sacrifice layer 2 when the sacrifice layer 2 is formed on the whole surface of the substrate 1. As a result, deterioration of the optical waveguide 14 in the optical characteristic and defect in the deposition in the formation of the optical waveguide may happen. Therefore, only the sacrifice layer 2 is formed and then is patterned so as to remain only a part of the formed layer necessary for the sacrifice layer 2.

Figure 4A:
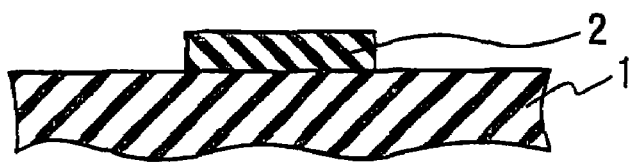
FIG. 4A to 4D are cross sectional views of the thermo-optic phase shifter in the manufacturing method according to a third embodiment of the present invention.
Figure 5A:
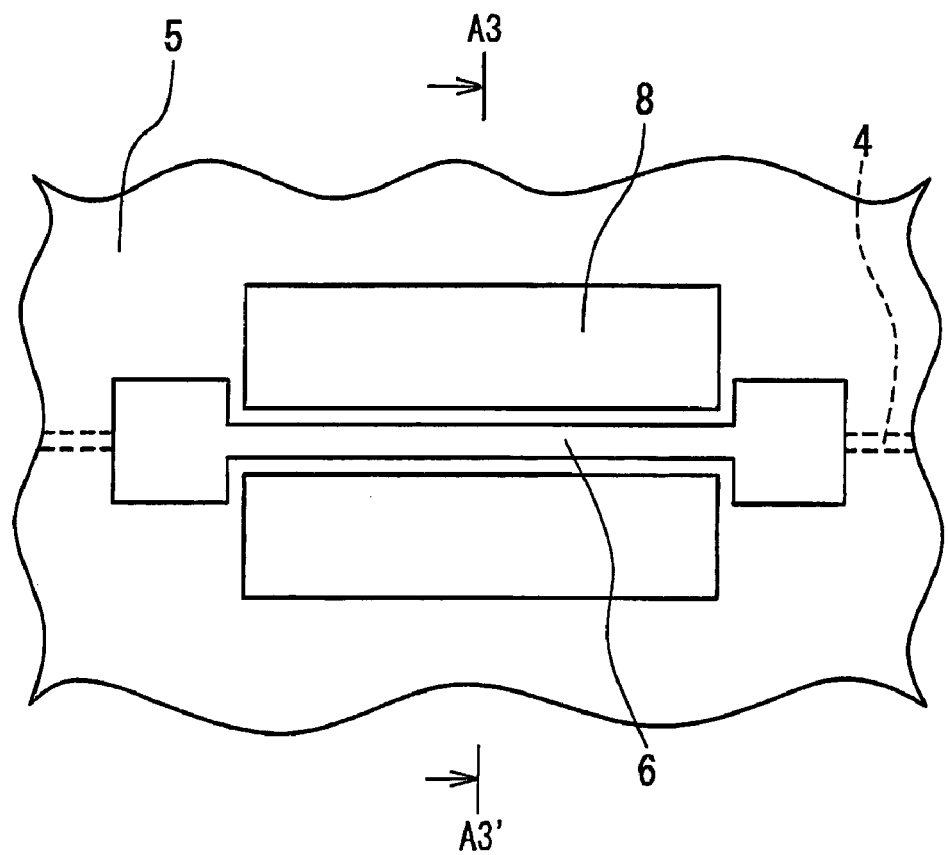
FIG. 5A is a plan view showing the thermo-optic phase shifter in the third embodiment.
Figure 5B:
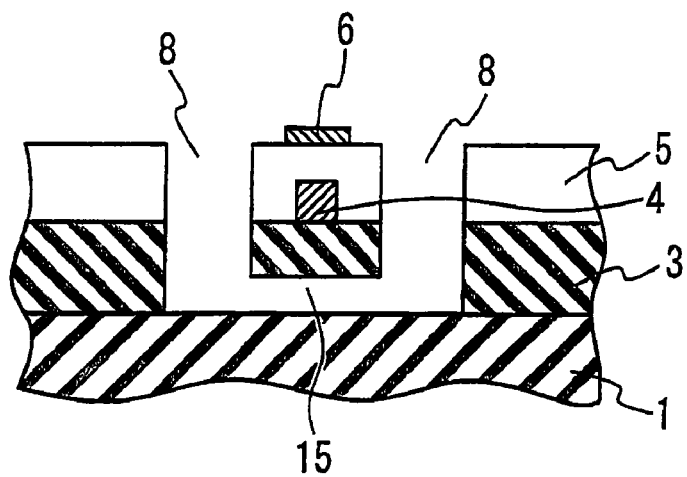
FIG. 5B is a cross sectional view of the thermo-optic phase shifter along the line A3-A3' shown in FIG. 5A.

First, as shown in FIG. 4A, the sacrifice layer 2 is formed on the whole surface of the substrate 1. The patterning is carried out to the sacrifice layer 2 by the photolithography method and the RIE method to be removed selectively. At this time, because the sacrifice layer 2 remains only straightly under the thin film heater 6 and has a fine line shape. Therefore, the stress is released. The PSG is used for the material of the sacrifice layer 2 as well as the first embodiment, for instance.

Figure 4B:
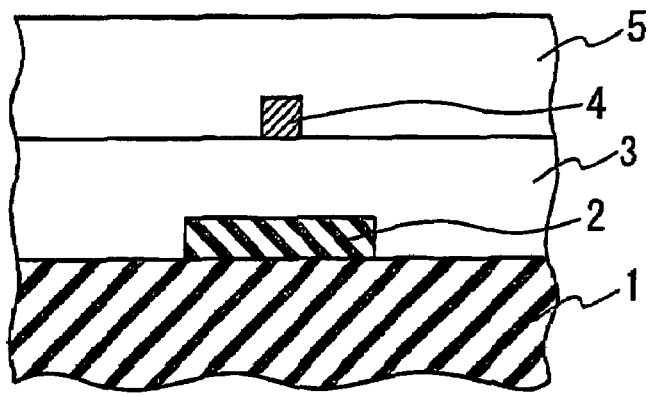
Figure 4C:
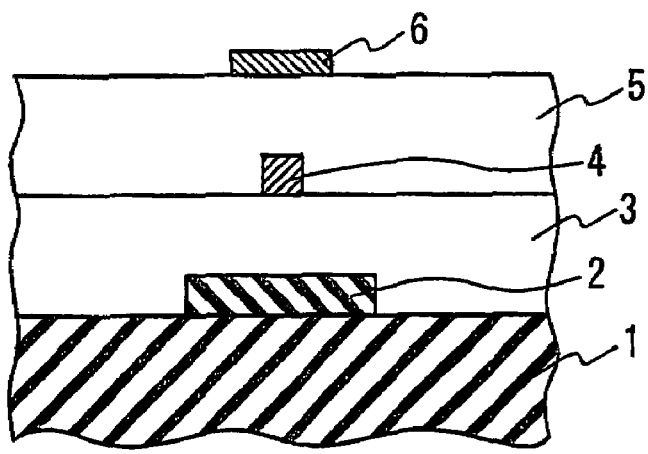
Figure 4D:
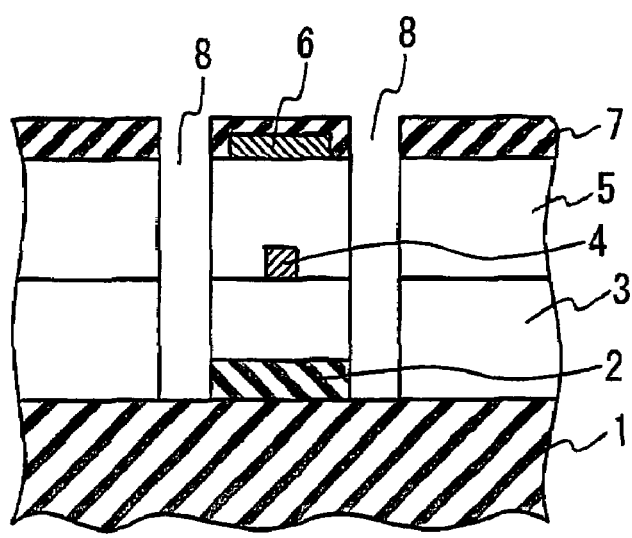

Next, as shown in FIG. 4B, the lower clad layer 3, the core layer 4, and the upper clad layer 5 are formed on the sacrifice layer 2 by the same method as in the first embodiment. Subsequently, as shown in FIG. 4C, the thin film heater 6 is formed on the surface of the upper clad layer 5 in the region corresponding to the sacrifice layer 2. Subsequently, as shown in FIG. 4D, the resist layer 7 is formed on the upper clad layer 5 and the thin film heater 6, as well as in the first embodiment. The upper clad layer 5, the lower clad layer 3, and the sacrifice layer 2 are sequentially etched by using the resist layer 7 as a mask. Then, the grooves 8 for etching are formed on both sides of the optical waveguide 14.

Thereafter, as shown in FIGS. 5A and 5B, a wet etching is carried out to the sacrifice layer 2 (see FIG. 4D) through the grooves 8, to remove the sacrifice layer 2. As a result, the sacrifice layer 2 does not remain, and the thermo-optic phase shifter can be formed in which the lower clad layer 3 is provided on the substrate 1 on the outside of the grooves 8. The structure and manufacturing method other than the modification in the third embodiment are substantially the same as in the first embodiment.

In the third embodiment, the sacrifice layer is selectively etched and one process is added. However, the stress generated in the sacrifice layer can be released. Therefore, the polarization dependence of the optical waveguide 14 can be decreased further more, and the optical characteristic can be improved more. Since the patterning of the sacrifice layer 2 is previously carried out, etching variation when the sacrifice layer 2 is removed by the wet etching can be resolved, then further reliability and the improvement of yield can be accomplished.

In addition, BHF can be used as etchant by forming the sacrifice layer 2 of PSG. Therefore, it is not needed that the sacrifice layer is formed of silicon and the fluorinated nitric acid is used as etchant, as disclosed in the above-mentioned Japanese Patent No. 3,152,182. Therefore, the thermo-optic phase shifter in the third embodiment is easier in manufacture than the thermo-optic phase shifter disclosed in the patent No. 3,152,182.

Figure 6A:
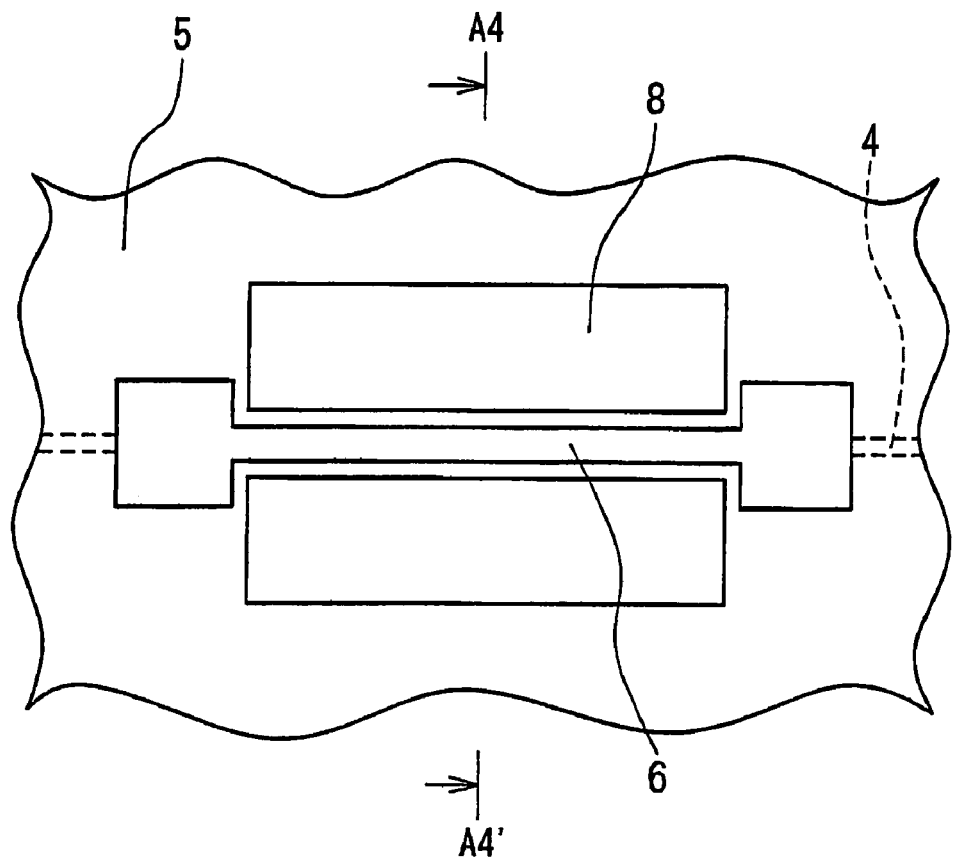
FIG. 6A is a plan view showing the thermo-optic phase shifter according to a forth embodiment of the present invention.
Figure 6B:
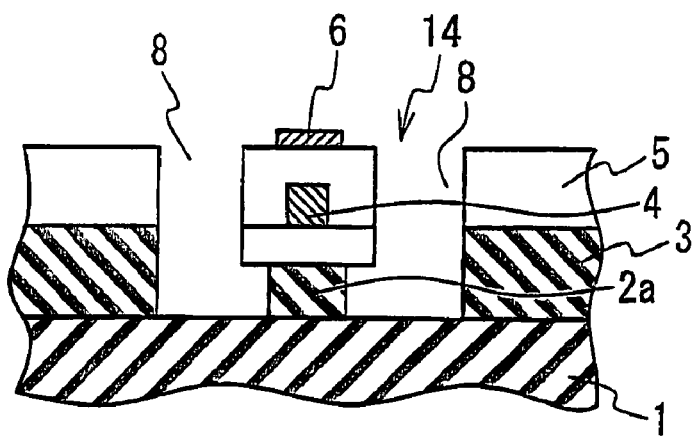
FIG. 6B is a cross sectional view of the thermo-optic phase shifter along the line A4-A4' shown in FIG. 6A.

Next, the thermo-optic phase shifter according to the forth embodiment of the present invention will be described. FIG. 6A is a plan view showing the thermo-optic phase shifter in the forth embodiment and FIG. 6B is a cross sectional view of the thermo-optic phase shifter along the line A4-A4' shown in FIG. 6A. The fourth embodiment is accomplished through a combination of the second embodiment and the third embodiment. As shown in FIGS. 6A and 6B, the manufacturing method of the sacrifice layer 2 (see FIG. 4D) and the optical waveguide 14 is the same as that of the third embodiment. However, a part of the sacrifice layer 2 is remained to form the pole 2a in the fourth embodiment. The width of the remained sacrifice layer 2 can be controlled by adjusting an etching time when the etching rate is previously known. The reason why the pole 2a is formed has been already described in the description of the second embodiment, in which strength can be improved although the effect lowering power consumption becomes small. Therefore, when the mechanical strength is highly needed and is indispensable to the thermo-optic phase shifter, the thermo-optic phase shifter in the forth embodiment is possible to be substituted to the thermo-optic phase shifter in the third embodiment. As a result, securing strength and reduction of the low power consumption can be balanced.

Figure 7A:
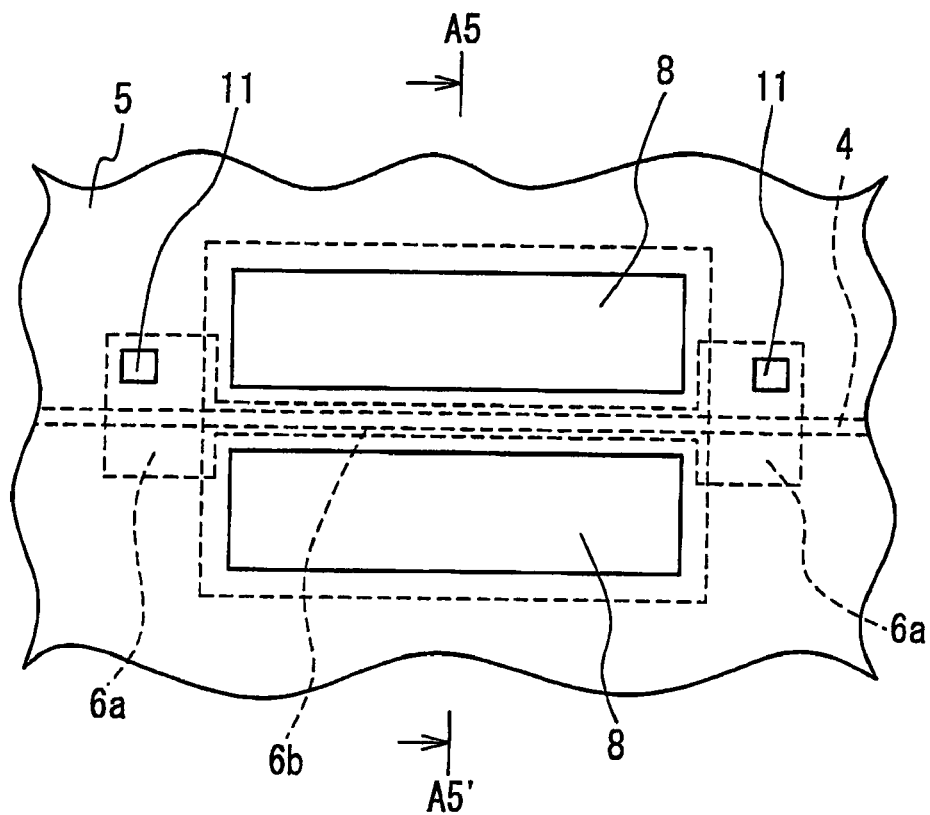
FIG. 7A is a plan view showing the thermo-optic phase shifter according to a fifth embodiment of the present invention.
Figure 7B:
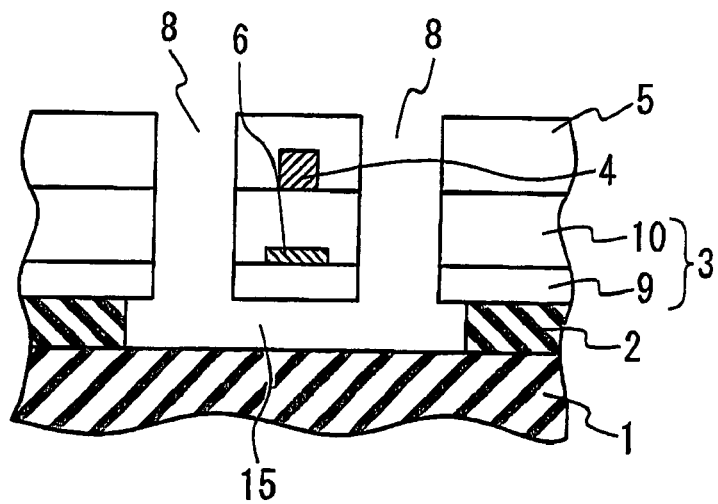
FIG. 7B is a cross sectional view of the thermo-optic phase shifter along the line A5-A5' shown in FIG. 7A.

Hereinafter, a thermo-optic phase shifter according to the fifth embodiment of the present invention will be described. FIG. 7A is a plan view showing the thermo-optic phase shifter in the fifth embodiment and FIG. 7B is a cross sectional view of the thermo-optic phase shifter along the line A5-A5' shown in FIG. 7A. FIG. 8A to 8D are cross sectional views of the thermo-optic phase shifter in the manufacturing method of the thermo-optic phase shifter according to the fifth embodiment of the present invention. The film heater 6 is formed internally in the lower clad layer 3 in the fifth embodiment although the thin film heater 6 is formed on the surface of the upper clad layer 5 in the first embodiment. That is to say, the lower clad layer 3 includes the first lower clad layer 9 formed on the sacrifice layer 2 and the second lower clad layer 10 formed on the first lower clad layer 9. The thin film heater 6 is formed on the first lower clad layer 9. The second lower clad layer 10 is formed to cover the thin film heater 6. Moreover, via-contacts 11 are provided in the second lower clad layer 10 and an upper clad layer 5 to supply electric power to electrode sections 6a of the thin film heater 6.

Figure 8A:
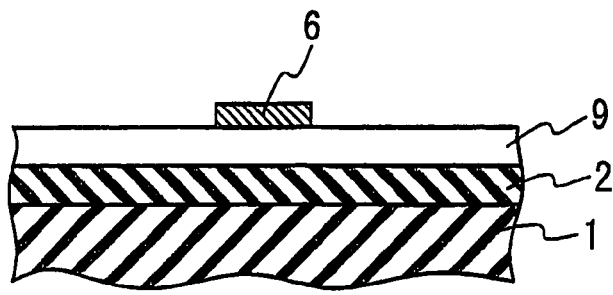
FIG. 8A to 8D are cross sectional views of the thermo-optic phase shifter in the manufacturing method of the thermo-optic phase shifter according to the fifth embodiment of the present invention.
Figure 8B:
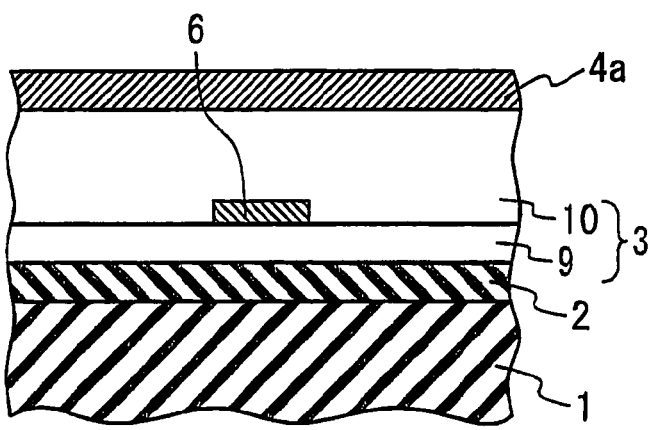
Figure 8C:
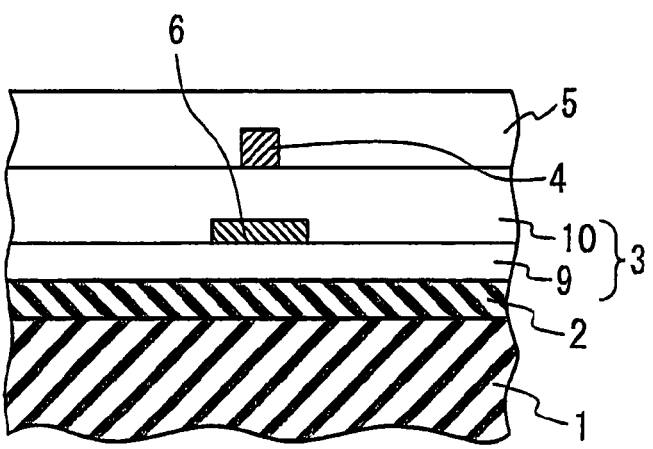
Figure 8D:
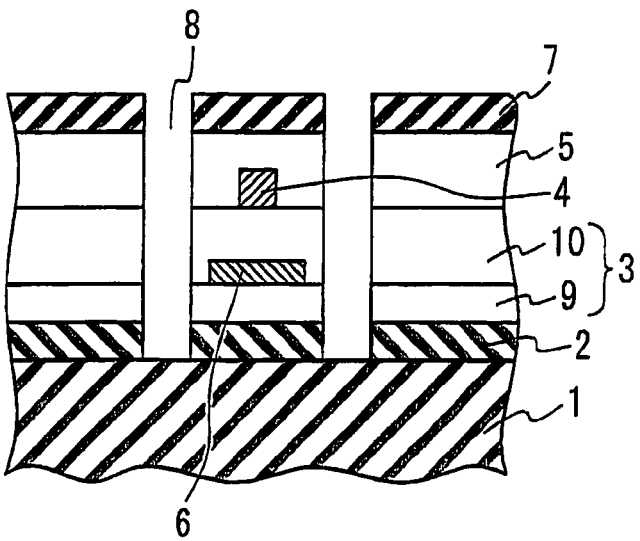

Next, a manufacturing method of the thermo-optic phase shifter in the fifth embodiment will be described. First of all, as shown in FIG. 8A, the sacrifice layer 2 if formed on the substrate 1, and then the first lower clad layer 9 is formed on the sacrifice layer 2. Subsequently, a chromium film is formed on the first lower clad layer 9 and then patterning is carried out to the chromium film to form the thin film heater 6. Subsequently, as shown in FIG. 8B, the second lower clad layer 10 is formed to bury the thin film heater 6 in the lower clad layer 3, and a thin film 4a is formed for the core layer 4. Subsequently, as shown in FIG. 8C, the film 4a is patterned to form the core layer 4 and then the upper clad layer 5 is formed. Subsequently, as shown in FIG. 8D, the grooves 8 are formed, and the sacrifice layer 2 is etched. The electrode via-contacts 11 are formed to pass through the upper clad layer 5 and the second lower clad layer 10 to the thin film heater 6. The forming of the electrode via-contacts 11 is carried out by the photolithography method and the RIE method. As a result, the optical phase shifter shown in FIGS. 7A and B can be formed. The structure and manufacturing method in the fifth embodiment other than the above-mentioned modification are substantially the same as those in the first embodiment.

In the first to fourth embodiments, the resist layer 7 is used in the forming of the grooves 8 (refer to FIG. 2D) and remains still after the forming of the groove 8 such that it is used to protect the thin film heater 6 in the etching of the sacrifice layer 2. However, strong acid is used for the etching of the sacrifice layer when the optical waveguide is formed of a material such as a semiconductor. In such a case, the resist layer cannot endure the strong acid. Therefore, in order to protect the thin film heater 6 from the strong acid, the thin film heater 6 is provided in the lower clad layer 3. As a result, the thermo-optic phase shifter can be easily manufactured, and the reliability can be improved.

Figure 9A:
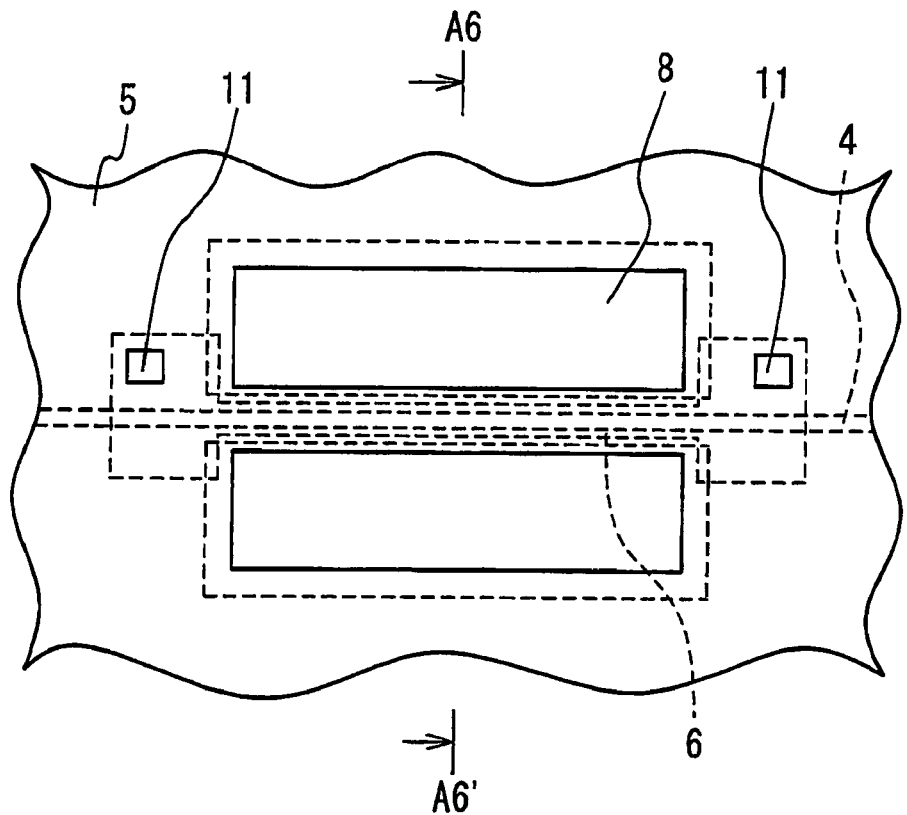
FIG. 9A is a plan view showing the thermo-optic phase shifter according to a sixth embodiment of the present invention.
Figure 9B:
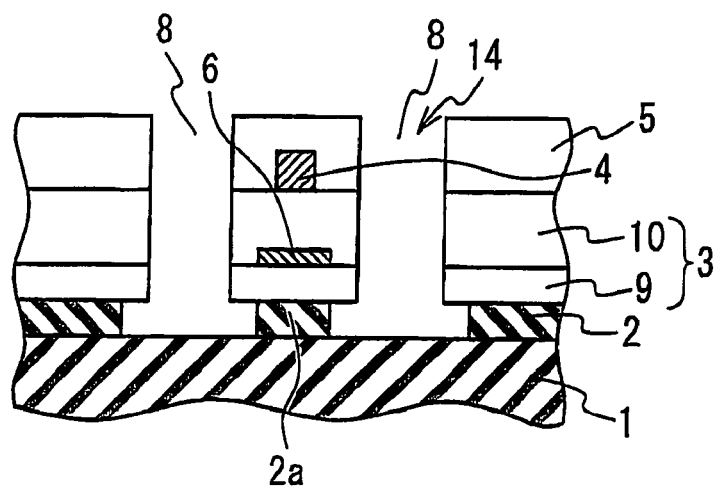
FIG. 9B is a cross sectional view of the thermo-optic phase shifter along the line A6-A6' shown in FIG. 9A.

Next, the thermo-optic phase shifter according to the sixth embodiment of the present invention will be described. FIG. 9A is a plan view showing the thermo-optic phase shifter in the sixth embodiment and FIG. 9B is a cross sectional view of the thermo-optic phase shifter along the line A6-A6' shown in FIG. 9A. The sixth embodiment is accomplished by a combination of the second embodiment and the fifth embodiment. That is to say, as shown in FIGS. 9A and 9B, the pole 2a formed of PSG is provided in the space 15 between the substrate 1 and the optical waveguide 14. The method of forming the pole 2a is the same as that in the second embodiment. Moreover, the structure and manufacturing method other than the above-mentioned modification in the sixth embodiment are substantially the same as in the fifth embodiment. The thin film heater can be protected without the resist layer in the etching of the sacrifice layer, and extreme mechanical strength can be secured in the sixth embodiment.

Figure 10A:
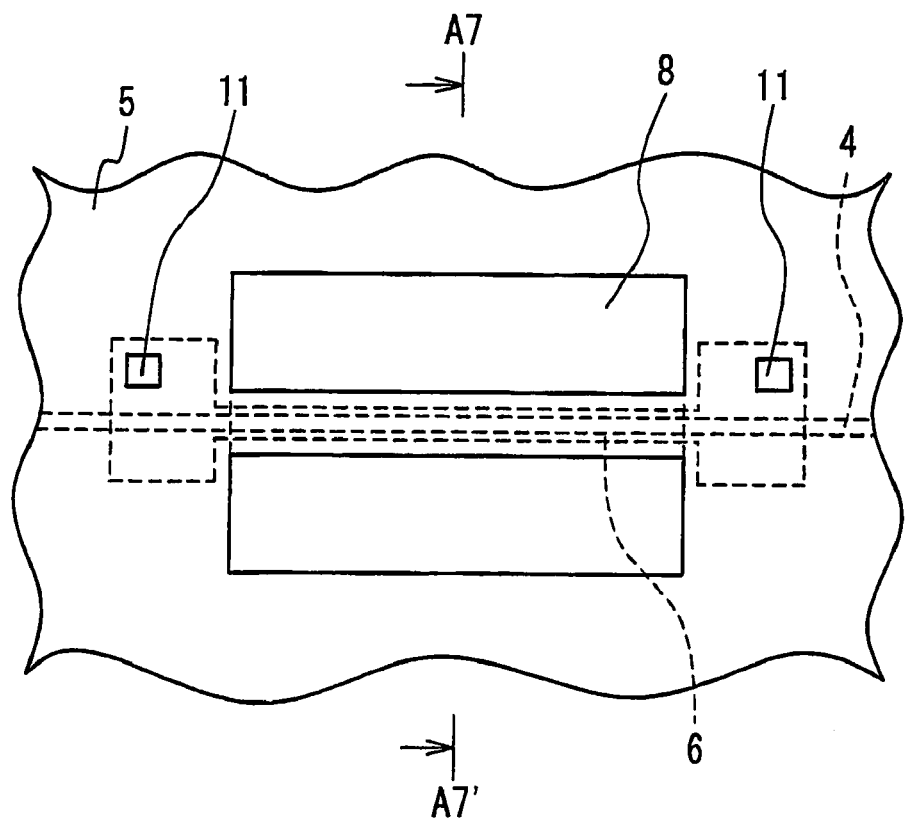
FIG. 10A is a plan view showing the thermo-optic phase shifter according to a seventh embodiment of the present invention.
Figure 10B:
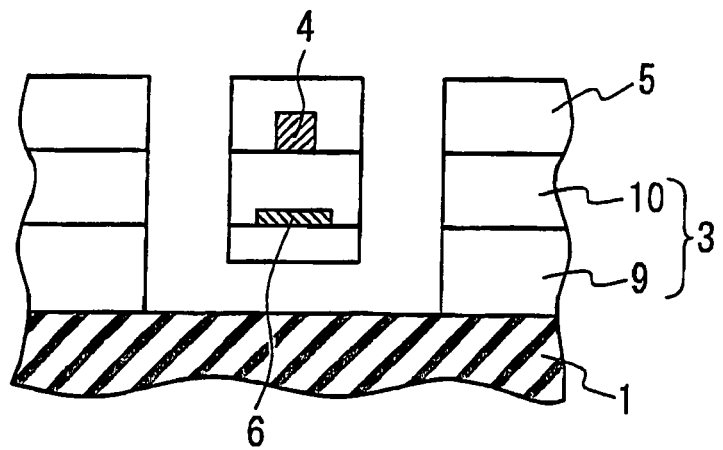
FIG. 10B is a cross sectional view of the thermo-optic phase shifter along the line A7-A7' shown in FIG. 10A.

Next, the thermo-optic phase shifter according to the seventh embodiment of the present invention will be described. FIG. 10A is a plan view showing the thermo-optic phase shifter in the seventh embodiment and FIG. 10B is a cross sectional view of the thermo-optic phase shifter along the line A7-A7' shown in FIG. 10A. FIGS. 11A to 11D are cross sectional views of the thermo-optic phase shifter in the manufacturing method of the thermo-optic phase shifter in the seventh embodiment of the present invention. The seventh embodiment is accomplished by a combination of the third embodiment and the fifth embodiment. In the fifth embodiment, the sacrifice layer 2 is formed on the whole surface of the substrate 1, and the sacrifice layer 2 and the lower clad layer 3 are successively formed. However, the sacrifice layer 2 is provided only in a region straightly under the thin film heater 6 in the seventh embodiment, as well as in the third embodiment. That is to say, as shown in FIGS. 10A and 10B, the lower clad layer 3 of the optical waveguide 14 includes the first lower clad layer 9 and the second lower clad layer 10 in the seventh embodiment. The thin film heater 6 is provided between the first lower clad layer 9 and the second lower clad layer 10. The structure and manufacturing method in the seventh embodiment other than the above-mentioned modification are substantially the same as those in the third embodiment.

Figure 11A:
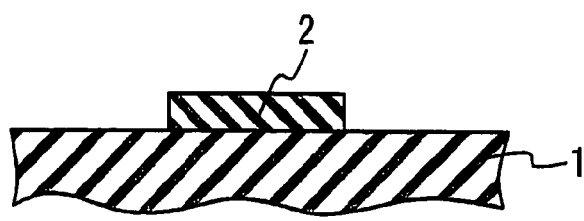
FIGS. 11A to 11D are cross sectional views of the thermo-optic phase shifter in the manufacturing method of the thermo-optic phase shifter in the seventh embodiment of the present invention.
Figure 11B:
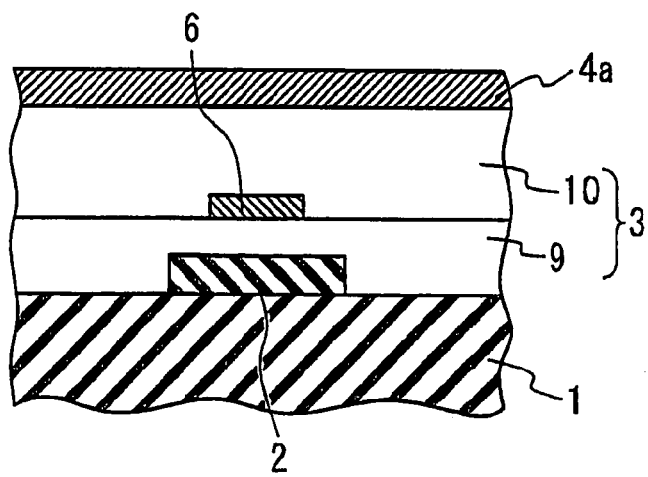
Figure 11C:
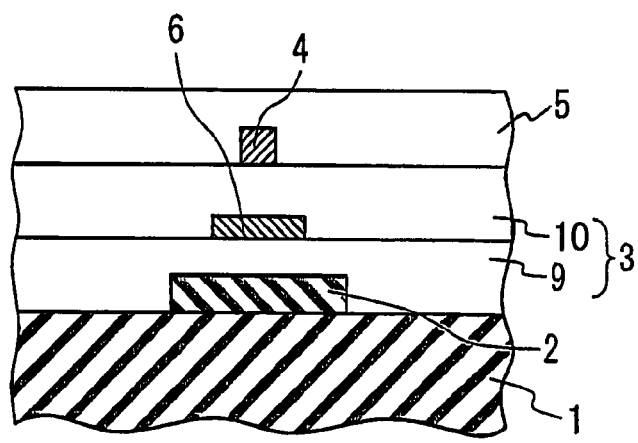
Figure 11D:
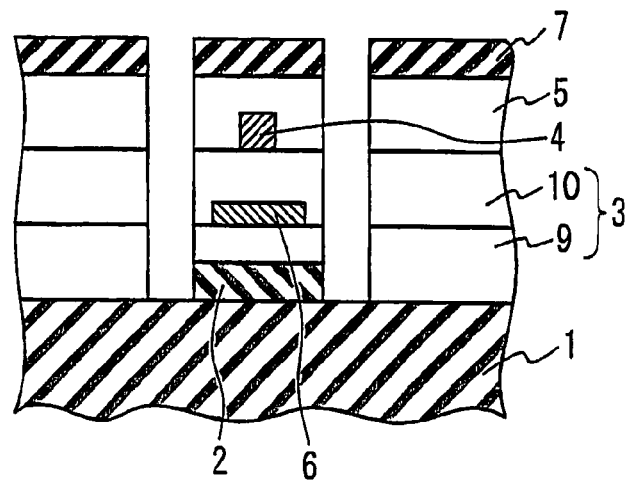

Next, the manufacturing method of the thermo-optic phase shifter in the seventh embodiment will be described. First, as shown in FIG. 11A, the sacrifice layer 2 is selectively formed on the surface of the substrate 1 as well as in the third embodiment. Subsequently, as shown in FIG. 11B, the first lower clad layer 9, the thin film heater 6, the second lower clad layer 10, and the thin film 4a are formed on the substrate 1 and the sacrifice layer 2, as well as in the fifth embodiment. Subsequently, as shown in FIG. 11C, patterning is carried out on the thin film 4a to form the core layer 4. The upper clad layer 5 is formed to cover the core layer 4. Subsequently, as shown in FIG. 11D, the resist layer 7 is formed on the upper clad layer 5. Then, the upper clad layer 5 and the lower clad layer 3 are etched by using the resist layer 7 as a mask. Thus, the grooves 8 are formed. Subsequently, as shown in FIGS. 10A and 10B, the sacrifice layer 2 is etched and removed through the grooves 8. Thus, the space 15 is formed. The electrode via-contacts 11 are formed pass through the upper clad layer 5 and the second lower clad layer 10.

The optical characteristic and mechanical strength of the thermo-optic phase shifter can be improved by releasing stress in the sacrifice layer in this embodiment, as well as the reason in the third embodiment. Moreover, the thin film heater 6 can be protected in the etching from the reason described in the fifth embodiment.

Figure 12A:
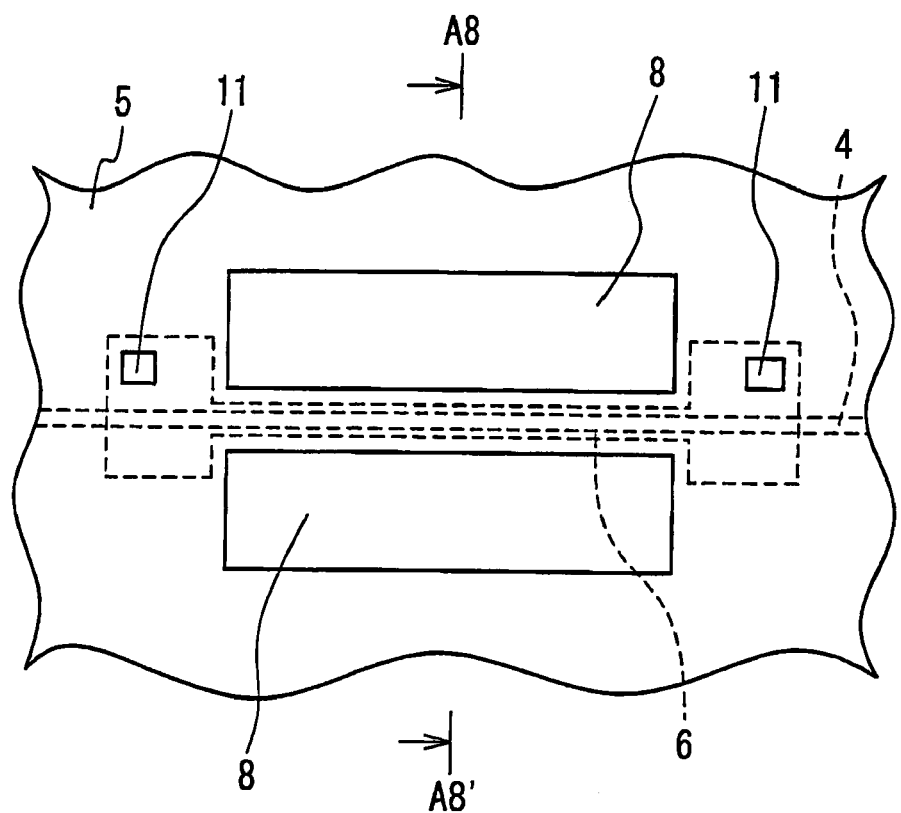
FIG. 12A is a plan view showing the thermo-optic phase shifter according to an eighth embodiment of the present invention.
Figure 12B:
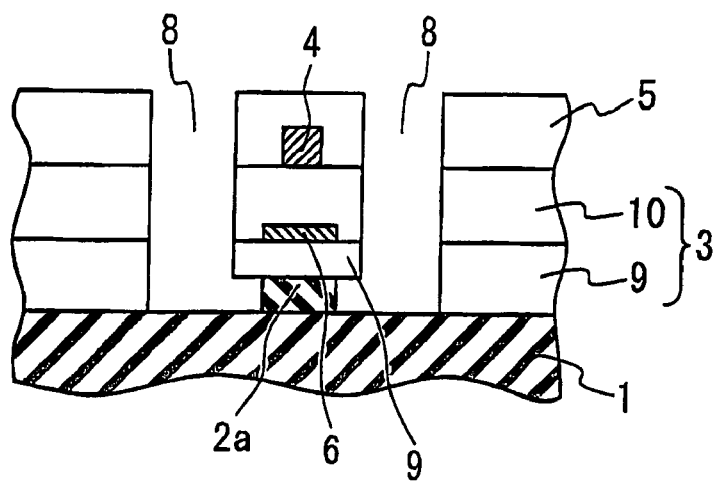
FIG. 12B is a cross sectional view of the thermo-optic phase shifter along the line A8-A8' shown in FIG. 12A.

Next, the thermo-optic phase shifter according to the eighth embodiment of the present invention will be described. FIG. 12A is a plan view showing the thermo-optic phase shifter in the eighth embodiment, and FIG. 12B is a cross sectional view of the thermo-optic phase shifter along the line A8-A8' shown in FIG. 12A. As shown in FIGS. 12A and 12B, the eighth embodiment is accomplished by a combination of the fourth embodiment and the fifth embodiment. In other words, the eighth embodiment is accomplished by a combination of the second embodiment and the seventh embodiment. In the eighth embodiment, a part of the sacrifice layer 2 is remained and the pole 2a formed of PSG is formed in the space 15. The structure and manufacturing method in the eighth embodiment other than the above-mentioned modification are substantially the same as those in the seventh embodiment. Improvement of the optical characteristic and mechanical strength can be achieved, and the thin film heater 6 can be protected in an etching in the eighth embodiment.

Figure 13A:
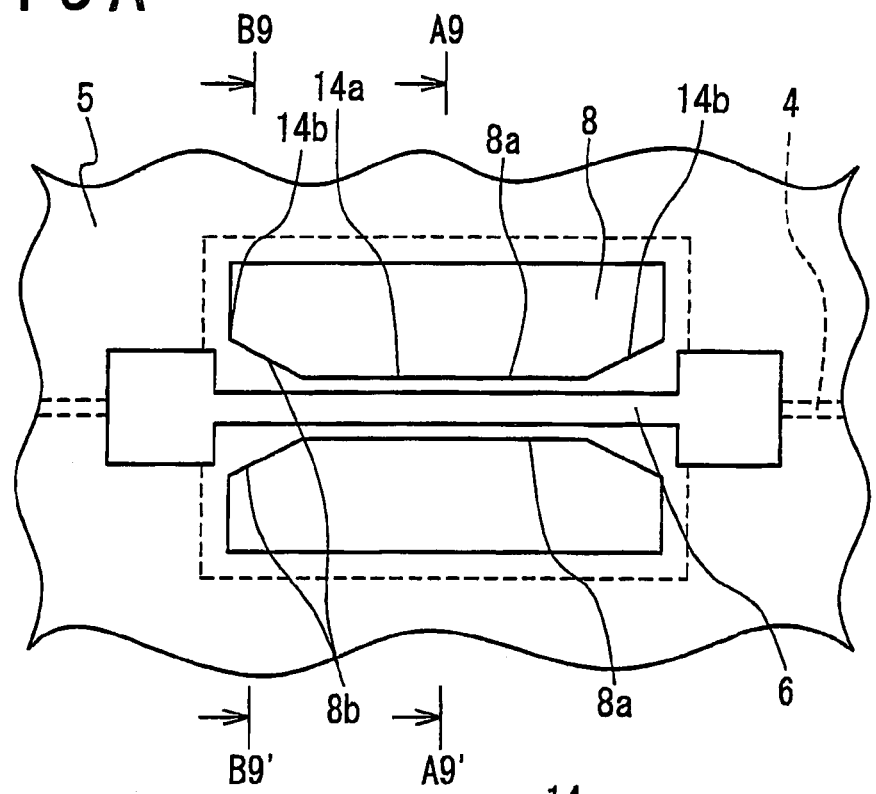
FIG. 13A is a plan view showing the thermo-optic phase shifter according to a ninth embodiment of the present invention.
Figure 13B:
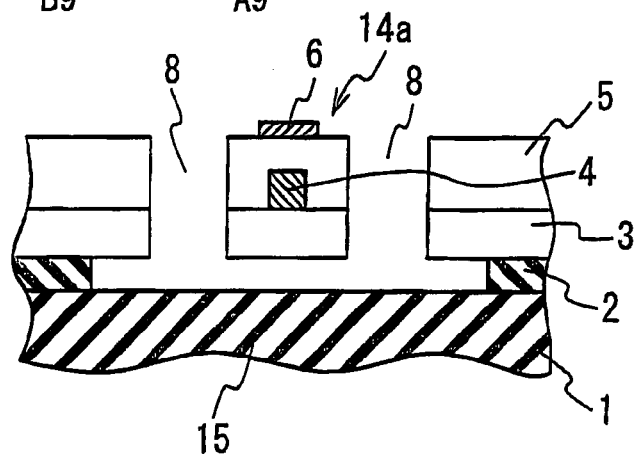
FIG. 13B is a cross sectional view of the thermo-optic phase shifter along the line A9-A9' shown in FIG. 13A.
Figure 13C:
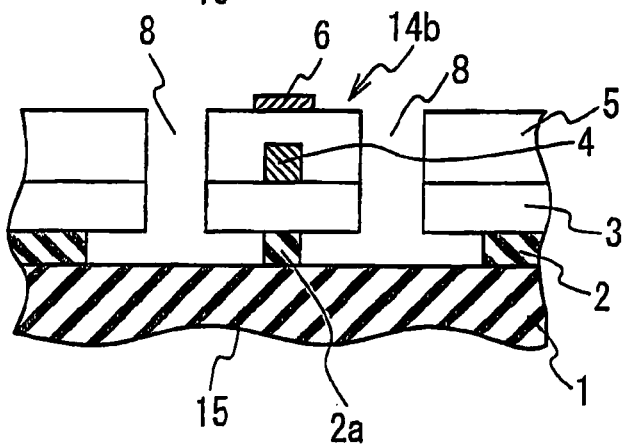
FIG. 13C is a cross sectional view of the thermo-optic phase shifter along the line B9-B9' shown in FIG. 13A.

Next, the thermo-optic phase shifter according to the ninth embodiment of the present invention will be described. FIG. 13A is a plan view showing the thermo-optic phase shifter in the ninth embodiment, and FIG. 13B is a cross sectional view of the thermo-optic phase shifter along the line A9-A9' shown in FIG. 13A. FIG. 13C is a cross sectional view of the thermo-optic phase shifter along the line B9-B9' shown in FIG. 13A. As shown in FIGS. 13A and 13B, side surfaces 8a of the grooves 8 near to the core layer 4 are curved in a tapered manner to separate from the core layer 4 as coming close to both ends 8b of the grooves 8, that is in a parallel side to the extending direction of the core layer 4 in the thermo-optic phase shifter in the ninth embodiment. The side surfaces 8a of the grooves 8 are in parallel to a longitudinal direction of the grooves 8, i.e., in a direction for the core layer 4 to extend. As a result, root sections 14b of the bridge section 14a of the optical waveguide 14 is thicker than a portion of the bridge section 14a other than the root section 14b. Also, in the region straightly under the root section 14b, the sacrifice layer 2 is remained in the etching, and the pole 2a is formed in the space 15. The structure in the ninth embodiment other than the above-mentioned modification is substantially the same as that in the first embodiment.

In the thermo-optic phase shifter in the first embodiment, the mechanically weakest portion is the root section 14b of the bridge section 14a of the optical waveguide 14. The strongest mechanical stresses would concentrate on this portion. Thus, in the ninth embodiment, the root section 14b is curved in a taper manner and is reinforced. As a result, the reliability of the thermo-optic phase shifter can be more improved. Also, to manufacture the thermo-optic phase shifter in the ninth embodiment, it is only needed to change a photolithography mask pattern used for patterning the resist layer 7 in the first embodiment. Therefore, the thermo-optic phase shifter can be formed in self-alignment as well as in the first embodiment, without changing the manufacturing process of the thermo-optic phase shifter except the mask shape.

Figure 14A:
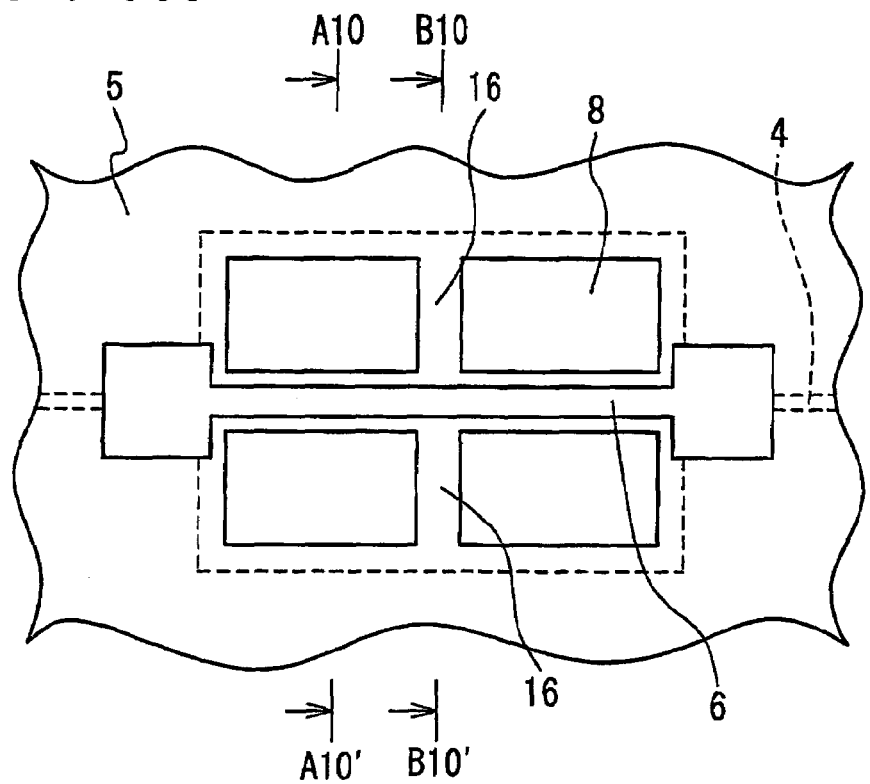
FIG. 14A is a plan view showing the thermo-optic phase shifter according to a tenth embodiment of the present invention.
Figure 14B:
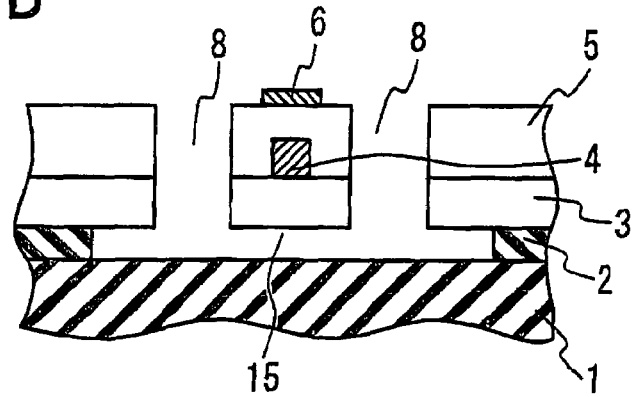
FIG. 14B is a cross sectional view of the thermo-optic phase shifter along the line A10-A10' shown in FIG. 10A.
Figure 14C:
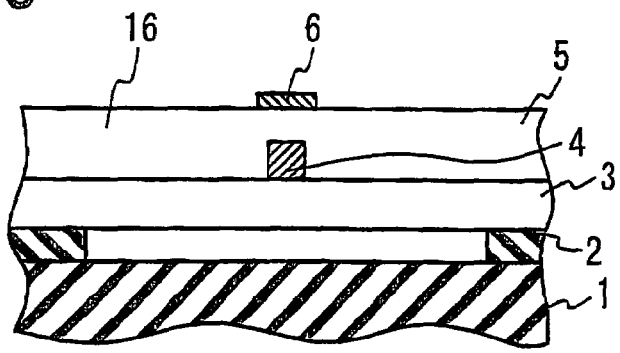
FIG. 14C is a cross sectional view of the thermo-optic phase shifter along the line B10-B10' shown in FIG. 14A.

Next, the thermo-optic phase shifter according to the tenth embodiment of the present invention will be described. FIG. 14A is a plan view showing the thermo-optic phase shifter in the tenth embodiment, and FIG. 14B is a cross sectional view of the thermo-optic phase shifter along the line A10-A10' shown in FIG. 10A. FIG. 14C is a cross sectional view of the thermo-optic phase shifter along the line B10-B10' shown in FIG. 14A. As shown in FIGS. 14A to 14B, in the tenth embodiment, a reinforcement beam 16 is provided on a middle portion of the bridge section 14a of the optical waveguide 14 to support the optical waveguide 14. The reinforcement beam 16 extends in a direction orthogonal to the direction of the core layer 4 extending to bridge the optical waveguide 14 over the grooves 8. The structure in the tenth embodiment other than the above-mentioned modification is substantially the same as that in the first embodiment.

In the first embodiment, when the bridge section 14a of the optical waveguide 14 is long in the longitudinal direction, a degrees-of-freedom of the bridge section 14a becomes high in the lateral direction of the bridge section 14a, i.e., in the direction orthogonal to the direction of the core layer 4. In such a case, there is a possibility that the optical waveguide 14 bends in a middle portion, so that a propagation loss increases, or thermal insulation is ruined due to contact of the bridge section 14a with the substrate 1 or a portion of the clad layer 13 other than the optical waveguide 14.

On the other hand, in the tenth embodiment, the degrees-of-freedom of the bridge section 14a in the horizontal direction of the bridge section 14a is restricted by providing the reinforcement beam 16. As a result, the bridge section 14a can be prevented from bending in the horizontal direction even when the optical waveguide 14 receives external force, resulting in improvement of the reliability of the thermo-optic phase shifter. By adopting such a structure, the thermal insulation would be ruined a little. However, when the reinforcement beam 16 is formed of a material with a sufficiently low thermal conductivity, a thermal conduction path for a large amount of heat is not formed because the heat conduction path to substrate 1 is long. To manufacture the thermo-optic phase shifter in the tenth embodiment, it is enough to change a photolithography mask pattern used for the patterning of the resist layer 7 in the first embodiment. Therefore, the thermo-optic phase shifter can be formed in self-alignment, as well as in the first embodiment, without changing the manufacturing process of the thermo-optic phase shifter except the mask shape. It should be noted that the number of the reinforcement beams 16 is not limited to one in each side, and a plurality of reinforcement beams 16 may be provided in each side.

Figure 15A:
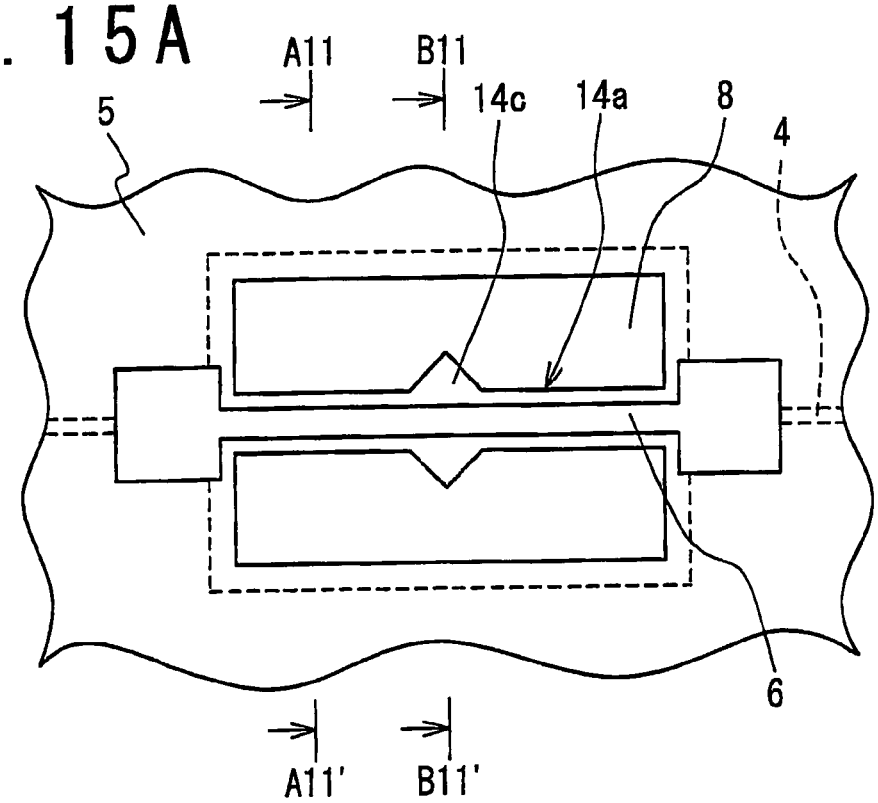
FIG. 15A is a plan view showing the thermo-optic phase shifter according to an eleventh embodiment of the present invention.
Figure 15B:
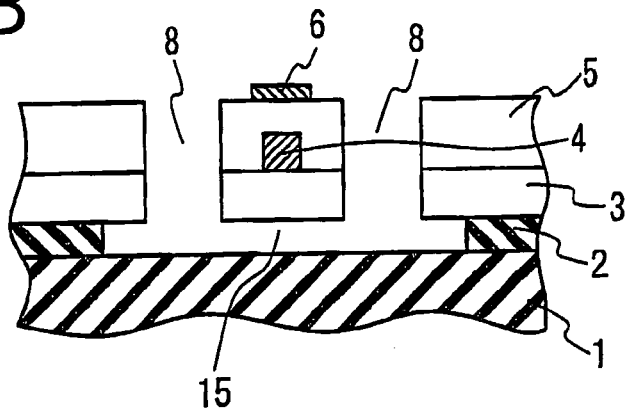
FIG. 15B is a cross sectional view of the thermo-optic phase shifter along the line A11-A11' shown in FIG. 15A.
Figure 15C:
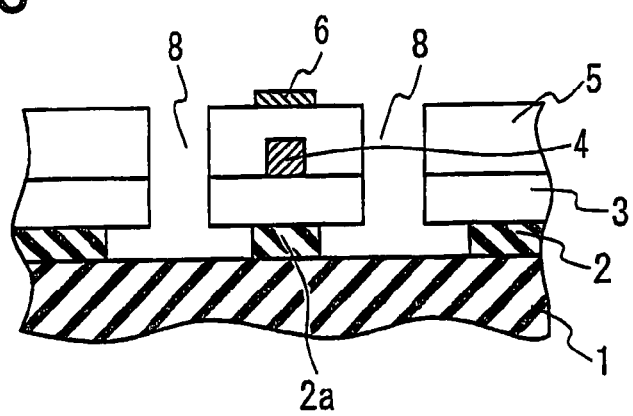
FIG. 15C is a cross sectional view of the thermo-optic phase shifter along the line B11-B11' shown in FIG. 15A.

Next, the thermo-optic phase shifter according to the eleventh embodiment of the present invention will be described. FIG. 15A is a plan view showing the thermo-optic phase shifter in the eleventh embodiment, and FIG. 15B is a cross sectional view of the thermo-optic phase shifter along the line A11-A11' shown in FIG. 15A. FIG. 15C is a cross sectional view of the thermo-optic phase shifter along the line B11-B11' shown in FIG. 15A. As shown in FIGS. 15A to 15B, in the eleventh embodiment, the pole 2a is provided in the space 15 under a central portion of the bridge section 14 in the longitudinal direction of the optical waveguide 14. The pole 2a is formed of the same material as the sacrifice layer 2 (see FIG. 1D), that is, PSG. The pole 2a is provided on the substrate 1, and supports the optical waveguide 14 to the substrate 1 to restrict the degrees-of-freedom of the bridge section 14a in a vertical direction. It should be noted that a portion 14c of the bridge section 14a corresponding to the pole 2a has the larger width than the other portion.

In the first embodiment, the degrees-of-freedom of the bridge section 14a in the horizontal direction becomes large when the bridge section 14a is long in the longitudinal direction of the optical waveguide 14. Therefore, there is a possibility that the optical waveguide 14 bends on a middle portion, to increase propagation loss or to ruin thermal insulation through contact with the substrate 1.

For this reason, in the eleventh embodiment, the above phenomena are prevented by providing the pole on a suitable portion of the bridge section 14a. By adopting such a structure, thermal insulation might be ruined. However, when the size of the pole is about 10 μm in length and width, heat conduction is low enough and the pole does not function as a thermal conduction path for a large amount of heat, because the pole is formed of PSG whose thermal conductivity is lower than the substrate. Also, to manufacture the thermo-optic phase shifter in the eleventh embodiment, it is enough to change a photolithography mask pattern used for patterning the resist layer 7, so that the portion 14c of the optical waveguide 14 which is wider than the other portion is formed, as well as the ninth and tenth embodiments. As a result, the sacrifice layer 2 remains under the portion 14c in the etching of the sacrifice layer 2 to form the pole 2a. In this way, the thermo-optic phase shifter can be formed in self-alignment, as well as the first embodiment, without changing the manufacturing process of the thermo-optic phase shifter except the mask shape. It should be noted that the number of the poles 2a is not limited one, and may be plural.

Figure 16A:
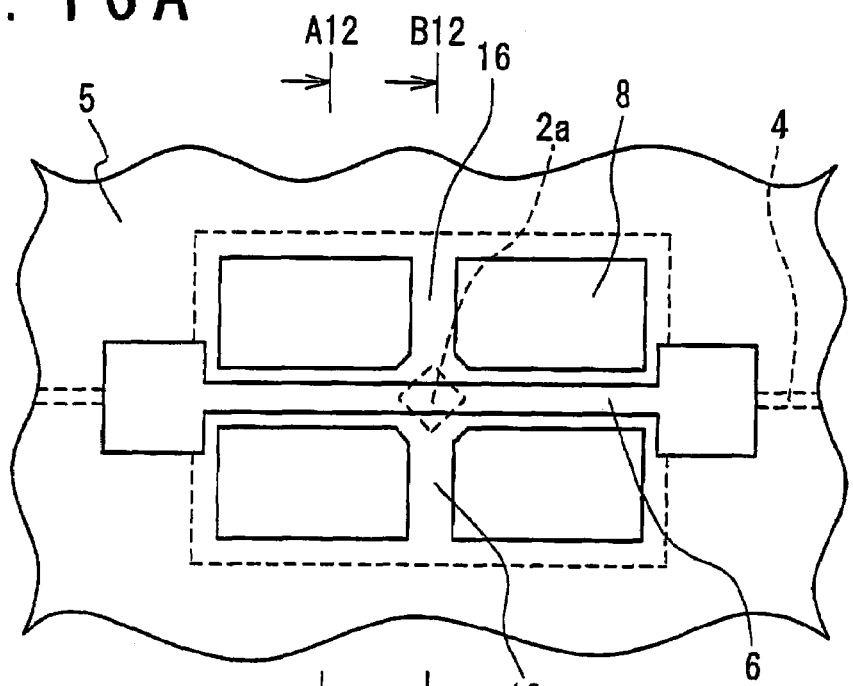
FIG. 16A is a plan view showing the thermo-optic phase shifter according to a twelfth embodiment of the present invention.
Figure 16B:
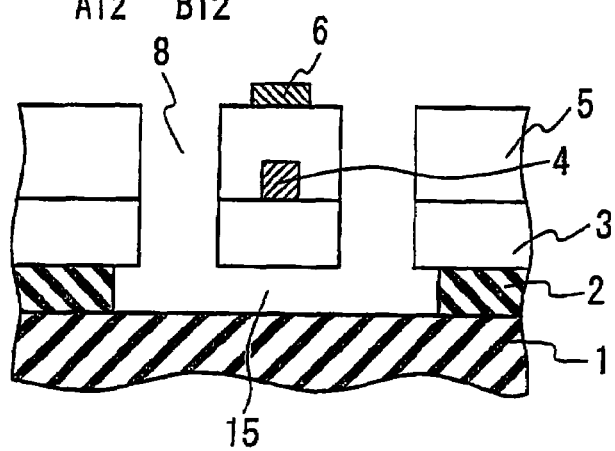
FIG. 16B is a cross sectional view of the thermo-optic phase shifter along the line A12-A12' shown in FIG. 16A.
Figure 16C:
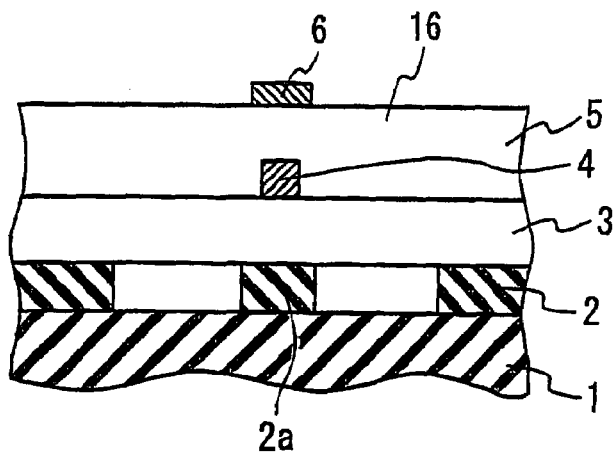
FIG. 16C is a cross sectional view of the thermo-optic phase shifter along the line B12-B12' shown in FIG. 16A.

Next, the thermo-optic phase shifter according to the twelfth embodiment of the present invention will be described. FIG. 16A is a plan view showing the thermo-optic phase shifter in the twelfth embodiment, and FIG. 16B is a cross sectional view of the thermo-optic phase shifter along the line A12-A12' shown in FIG. 16A. FIG. 16C is a cross sectional view of the thermo-optic phase shifter along the line B12-B12' shown in FIG. 16A. As shown in FIGS. 16A to 16C, the twelfth embodiment is accomplished by a combination of the tenth embodiment and the eleventh embodiment. The beam 16 and the pole 2a are provided on a middle portion of the bridge section 14a in the twelfth embodiment. The structure and manufacturing method in the twelfth embodiment other than the above-mentioned modification are substantially the same as those in the first embodiment.

When the thermo-optic waveguide is used under the circumstance that strength becomes lack in the structures of the thermo-optic phase shifters shown in the ninth, tenth, and eleventh embodiments, the degrees-of-freedom of the bridge section 14a in the horizontal direction and in the vertical direction can be restricted by adopting the structure shown in the twelfth embodiment. In this way, the strength can be secured although the electric power consumption is somewhat increased. To adopt this structure, it is only enough to change the photolithography mask pattern used when etching for the grooves is carried out, and the optical waveguide can be manufactured in self-alignment without changing the manufacturing process.

Figure 17A:
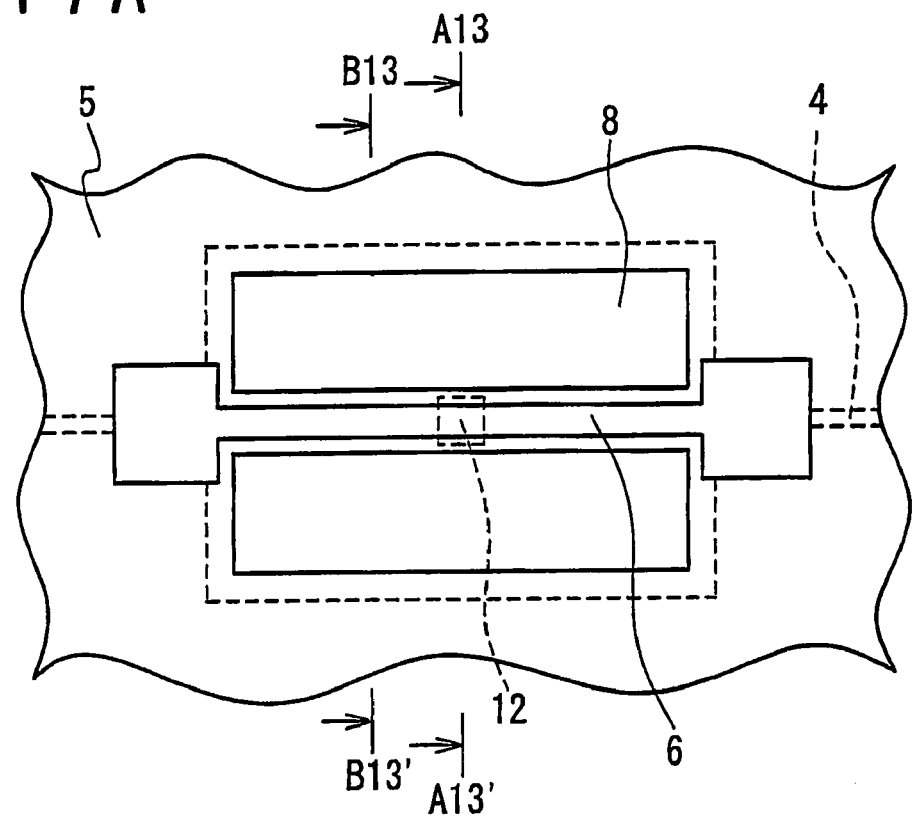
FIG. 17A is a plan view showing the thermo-optic phase shifter according to a thirteenth embodiment of the present invention.
Figure 17B:
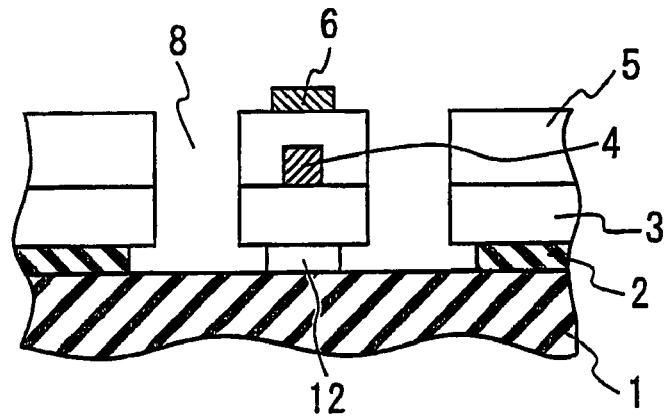
FIG. 17B is a cross sectional view of the thermo-optic phase shifter along the line A13-A13' shown in FIG. 17A.
Figure 17C:
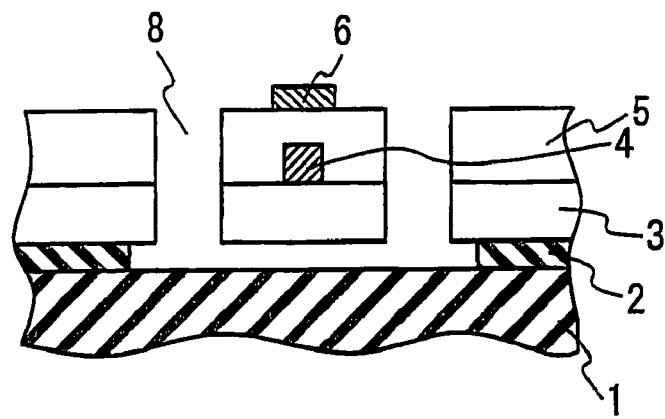
FIG. 17C is a cross sectional view of the thermo-optic phase shifter along the line B13-B13' shown in FIG. 17A.
Figure 18A:
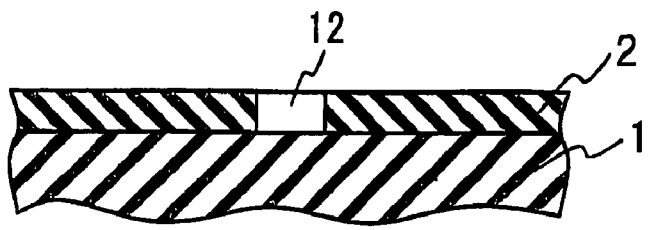
FIGS. 18A to 18D are cross sectional views of the thermo-optic phase shifter showing the manufacturing method of the thermo-optic phase shifter in the thirteenth embodiment of the present invention.
Figure 18B:
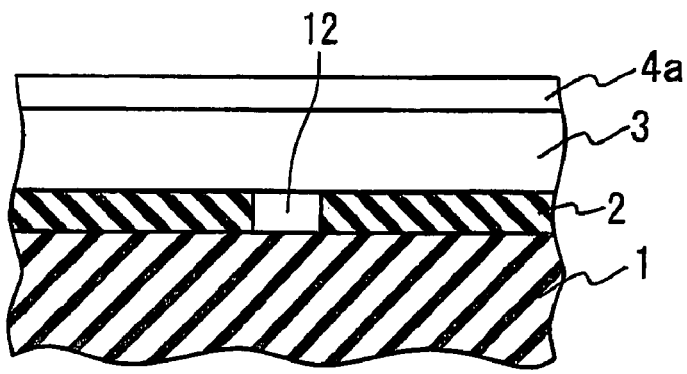
Figure 18C:
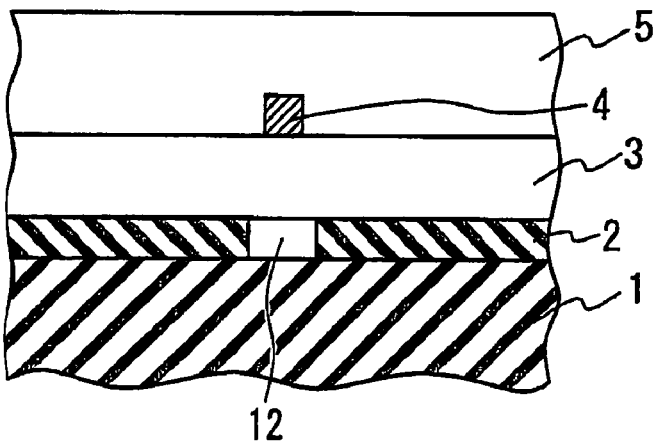
Figure 18D:
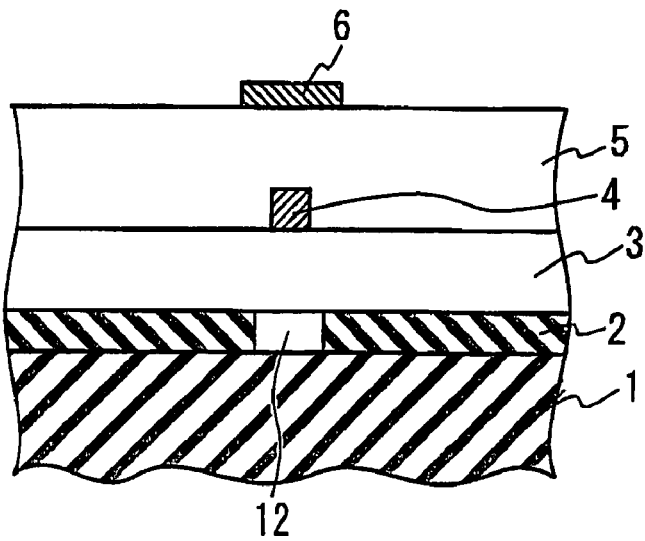
Figure 19:
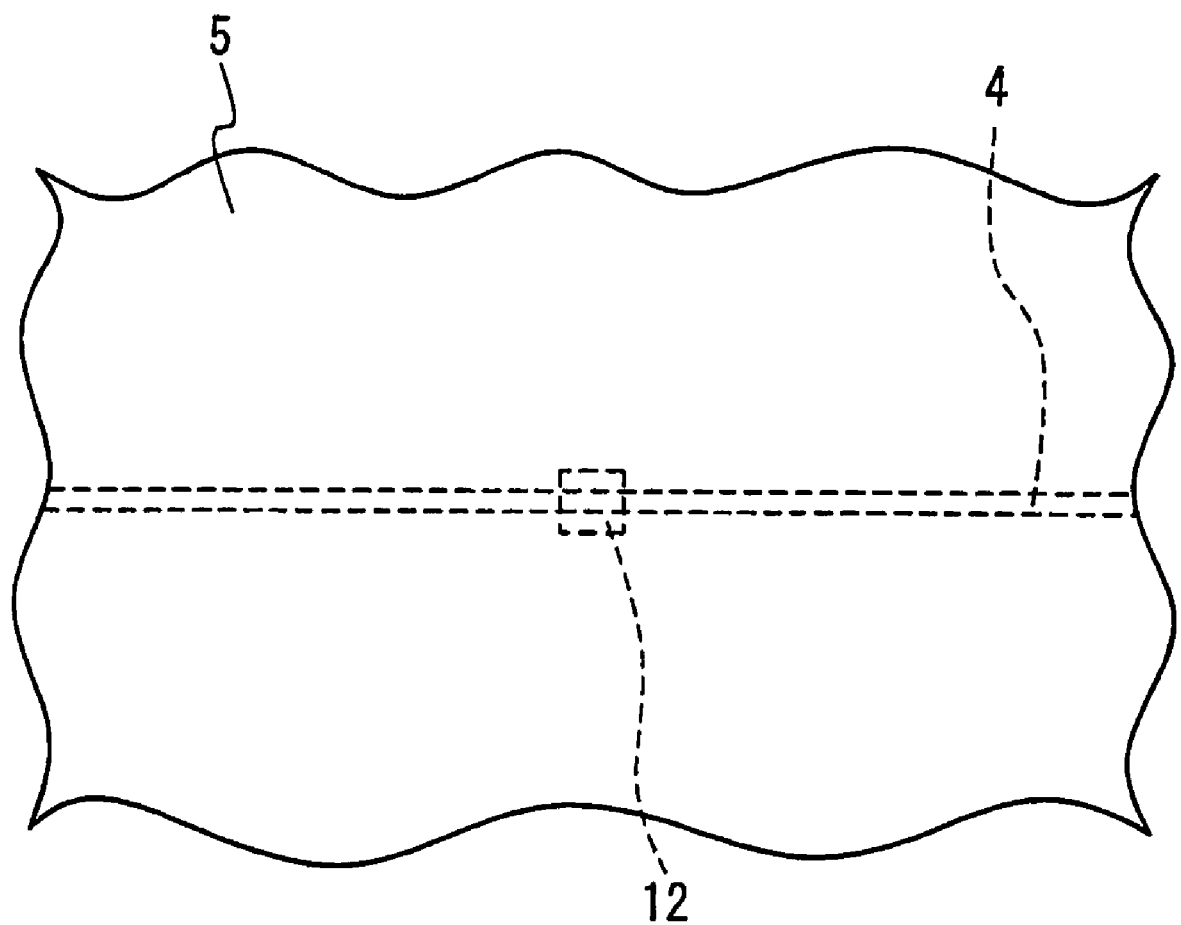
FIG. 19 is a plain view of a process shown in FIG. 18C in the manufacturing method of the thermo-optic phase shifter in the thirteenth embodiment.

Next, the thermo-optic phase shifter according to the thirteenth embodiment of the present invention will be described. FIG. 17A is a plan view showing the thermo-optic phase shifter in the thirteenth embodiment, and FIG. 17B is a cross sectional view of the thermo-optic phase shifter along the line A13-A13' shown in FIG. 17A. FIG. 17C is a cross sectional view of the thermo-optic phase shifter along the line B13-B13' shown in FIG. 17A. FIGS. 18A to 18D are cross sectional views of the thermo-optic phase shifter showing the manufacturing method of the thermo-optic phase shifter in the thirteenth embodiment of the present invention. FIG. 19 is a plain view of a process shown in FIG. 18C in the manufacturing method of the thermo-optic phase shifter in the thirteenth embodiment.

As shown in FIGS. 17A to 17D, the pole 12 is formed in a part of the space 15 in the thermo-optic phase shifter in the thirteenth embodiment. The pole 12 is formed of a material with a smaller etching rate than the sacrifice layer 2 (see FIG. 1D). For instance, the pole 12 is formed of BPSG, when the sacrifice layer 2 is formed of PSG. The pole 12 is provided in a portion of the bridge section 14a in the longitudinal direction of the bridge section 14a to support the bridge section 14a to the substrate 1. The pole 12 restricts the degrees-of-freedom of the bridge section 14a in the vertical direction.

Next, a manufacturing method of the thermo-optic phase shifter in the thirteenth embodiment will be described. First, as shown in FIG. 18A, the sacrifice layer 2 is formed of PSG on the substrate 1, for instance. A part of the sacrifice layer 2 is removed by the photolithography method and the RIE method, and BPSG film is buried in the removed part to form the pole 12. Subsequently, as shown in FIG. 18B, the lower clad layer 3 and the thin film 4a are formed by the same method as in the first embodiment. Subsequently, as shown in FIG. 18C and FIG. 19, the thin film 4a is patterned to form the core layer 4, and the upper clad layer 5 is formed. Subsequently, as shown in FIG. 18D, the thin film heater 6 is formed on the upper clad layer 5. Then, as shown in FIGS. 17A to 17C, two grooves 8 are formed to put the optical waveguide 14 between them. The sacrifice layer 2 under the optical waveguide 14 is etched and removed so as to form the space 15. At this time, the pole 12 of BPSG remains without being etched. The structure and manufacturing method in the thirteenth embodiment other than the above-mentioned modification are same as those in the first embodiment.

In the eleventh embodiment as mentioned above, the pole is formed by stopping the etching of the sacrifice layer in a suitable time. However, in the thirteenth embodiment, the pole is formed in the part of the sacrifice layer of a material not etched in the etching of the sacrifice layer. As a result, the pole can be formed in self-alignment even when the etching rate of the sacrifice layer is extremely fast with difficultly to stop the etching on the way. Thus, reliability and reproducibility in the manufacturing process can be improved.

In each embodiment mentioned above, the optical waveguide is described as a buried type waveguide. However, the structure of the waveguide in the thermo-optic phase shifter of the present invention is not limited to this type, and the effect of the present invention could be achieved enough in a ridge type waveguide, for example.

In addition, the shape of the thin film heater is not limited to a straight line shape. It may be the shape of a combination of a plurality of lines shapes or may be curved. If the thin film heater can heat the core layer of the optical waveguide up to a desired temperature and can generate heat enough to induce a refractive index change, any shape may be adopted. Furthermore, the width of the bridge section in the optical waveguide when the pole is provided may be narrower than the width of the bridge section in the optical waveguide when the pole is not provided.

Also, in the manufacturing of the thermo-optic phase shifter, it would be apparent to a person in the art that hydrofluoric acid solution or buffered hydrofluoric acid solution can be used in the etching of the sacrifice layer, and that an atmosphere pressure chemical vapor deposition or a plasma chemistry vapor deposition can be used for the sacrifice layer. In addition, it would be apparent to the person in the art that the width of the portion of the bridge section in the optical waveguide where the pole is provided may be wider than that of a portion of the bridge section in the optical waveguide where the pole is not provided.

As described above, according to the thermo-optic phase shifter of the present invention, the optical waveguide is formed from the core layer and the clad layer on the substrate. The thermal insulation to the substrate of the optical waveguide is improved by providing the space of 4 μm or more between the substrate and the optical waveguide. Also, the optical characteristic, strength, stability, and reliability are excellent, and the electric power consumption is small. Additionally, the thermo-optic phase shifter can be easily manufactured by using the manufacturing method generally used for a large-scale electronic integrated circuit. Therefore, the present invention is extremely useful to achieve miniaturization, high functionality, and high-density of the optical circuit.

The invention claimed is:

1. A thermo-optic phase shifter comprising:
a substrate;
a heater;
a clad layer provided directly or indirectly on said substrate;
a bridge section clad layer formed apart from said substrate and said clad layer in a portion corresponding to said heater; and
a core layer provided inside said bridge section clad layer,
wherein said bridge section clad layer and said core layer form a bridge section optical waveguide in said heater corresponding portion, and
said heater is provided inside or outside said bridge section optical waveguide apart from said core layer in said heater corresponding portion, and generates heat to change a phase of a light signal propagated in said bridge section optical waveguide,
said clad layer is formed on said substrate through a sacrifice layer,
said sacrifice layer is formed of material with an etching rate larger than that of said substrate, and
said sacrifice layer is formed of the material with a thermal conductivity smaller than that of said substrate,
wherein said sacrifice layer is formed of glass doped with phosphorus, and said clad layer is formed of glass doped with boron and phosphorus.

2. The thermo-optic phase shifter according to claim 1, wherein said core layer, said clad layer and said bridge section clad layer are formed of glass material containing quartz.

3. The thermo-optic phase shifter according to claim 1, wherein said glass material of said core layer contains germanium.

4. The thermo-optic phase shifter according to claim 1, wherein said substrate is formed of glass material containing quartz or silicon.

5. The thermo-optic phase shifter according to claim 1, wherein said heater is provided on said bridge section clad layer.

6. The thermo-optic phase shifter according to claim 1, wherein said heater is provided in said bridge section clad layer apart from said core layer.

7. The thermo-optic phase shifter according to claim 6, wherein said heater is provided under said core layer in said bridge section clad layer.

8. A thermo-optic phase shifter comprising:
a substrate;
a heater;
a clad layer provided directly or indirectly on said substrate;
a bridge section clad layer formed apart from said substrate and said clad layer in a portion corresponding to said heater, said bridge section clad layer being connected with said clad layer in a portion of said phase shifter other than said heater corresponding portion;
a core layer provided inside said bridge section clad layer;
wherein said bridge section clad layer and said core layer form a bridge section optical waveguide in said heater corresponding portion;
said heater is provided inside or outside said bridge section optical waveguide apart from said core layer in said heater corresponding portion, and generates heat to change a phase of a light signal propagated in said bridge section optical waveguide; and
a pole in a space between said bridge section optical waveguide and said substrate to support said bridge section clad layer, said pole having a width smaller than a width of said bridge section clad layer.

9. The thermo-optic phase shifter according to claim 8, wherein a width of a portion of said bridge section optical waveguide where said supporting section is provided is wider than that of a portion of said bridge section optical waveguide where said supporting section is not provided.

10. The thermo-optic phase shifter according to claim 8, wherein said supporting section is formed of material with a thermal conductivity smaller than that of said substrate.

11. A thermo-optic phase shifter comprising:
a substrate;
a heater;
a clad layer provided directly or indirectly on said substrate;
a bridge section clad layer formed apart from said substrate and said clad layer in a portion corresponding to said heater, said bridge section clad layer being connected with said clad layer in a portion of said phase shifter other than said heater corresponding portion;
a core layer provided inside said bridge section clad layer; and
a pole in a space between said bridge section optical waveguide and said substrate to support said bridge section clad layer, said pole having a width smaller than a width of said bridge section clad layer,
wherein said bridge section clad layer and said core layer form a bridge section optical waveguide in said heater corresponding portion,
said heater is provided inside or outside said bridge section optical waveguide apart from said core layer in said heater corresponding portion, and generates heat to change a phase of a light signal propagated in said bridge section optical waveguide; and
said supporting section is formed of material of an etching rate larger than that of said substrate.

12. The thermo-optic phase shifter according to claim 8, wherein said supporting section is formed of a same material as said clad layer.

13. The thermo-optic phase shifter according to claim 8, wherein said supporting section is continuously formed over a full length of said bridge section optical waveguide in a direction in which said core layer extends.

14. The thermo-optic phase shifter according to claim 8, wherein said supporting section is formed in the portion in a direction in which said core layer extends.

15. The thermo-optic phase shifter according to claim 8, wherein said optical waveguide clad layer has a width wider at both distal ends of said heater corresponding portion than in a center of said heater corresponding portion.

16. The thermo-optic phase shifter according to claim 8, further comprising:
a reinforcing beam provided in grooves between said clad layer and said optical waveguide clad layer on a way of said heater corresponding portion to support said optical waveguide by connecting said clad layer and said optical waveguide clad layer.

17. A method of manufacturing a thermo-optic phase shifter, comprising:
forming a sacrifice layer on a substrate, said sacrifice layer having an etching rate larger than said substrate;
forming a lower clad layer to cover said sacrifice layer, said lower clad layer having an etching rate smaller than that of said sacrifice layer;
forming a core layer in a predetermined portion on said lower clad layer;
forming an upper clad layer on said lower clad layer and said core layer;
forming a heater in a portion corresponding to said predetermined portion on said upper clad layer;
forming grooves in a portion corresponding to said predetermined portion on both sides of said heater to pass through said upper clad layer and said lower clad layer to said sacrifice layer; and
removing at least a portion of said sacrifice layer through said grooves,
wherein said removing comprises:
removing said sacrifice layer to leave a portion for supporting said lower clad layer in a portion corresponding to said predetermined portion.

18. A method of manufacturing a thermo-optic phase shifter, comprising:
forming a sacrifice layer on a substrate, said sacrifice layer being formed of glass doped with phosphorus and having an etching rate larger than that of said substrate;
forming a first lower clad layer to cover said sacrifice layer, said first lower clad layer being formed of glass doped with boron and phosphorus and having an etching rate smaller than said sacrifice layer;
forming a heater in a predetermined portion on said first lower clad layer;
forming a second lower clad layer on said first lower clad layer, a lower clad layer having said lower first clad layer and said second lower clad layer;
forming a core layer in a portion corresponding to said predetermined portion on said second lower clad layer;
forming an upper clad layer on said lower clad layer and said core layer;
forming grooves on both sides of said heater in a portion corresponding to said predetermined portion to pass through said upper clad layer and said lower clad layer to said sacrifice layer; and
removing at least a portion of said sacrifice layer through said grooves.

19. The method of manufacturing a thermo-optic phase shifter according to claim 18, wherein said removing comprises:
removing said sacrifice layer to form a space between said lower clad layer and said substrate to connect said grooves with each other.

20. The method of manufacturing a thermo-optic phase shifter according to claim 17, wherein said forming an upper clad layer, said forming a core layer and said forming a lower clad layer are carried out by an atmosphere chemical vapor deposition method or a plasma chemical vapor deposition method.

21. A thermo-optic phase shifter comprising:
a substrate;
a heater;
a clad layer provided directly or indirectly on said substrate;
a bridge section clad layer formed apart from said substrate and said clad layer in a portion corresponding to said heater, said bridge section clad layer being connected with said clad layer in a portion of said phase shifter other than said heater corresponding portion;
a core layer provided inside said bridge section clad layer; and
a pole in a space between said bridge section optical waveguide and said substrate in an extending direction of said core layer to support said bridge section clad layer, said pole having a width smaller than a width of said bridge section clad layer,
wherein said bridge section clad layer and said core layer form a bridge section optical waveguide in said heater corresponding portion,
said heater is provided inside or outside said bridge section optical waveguide apart from said core layer in said heater corresponding portion, and generates heat to change a phase of a light signal propagated in said bridge section optical waveguide; and
said supporting section is formed of material with an etching rate larger than that of said substrate, and a thermal conductivity of said supporting section is smaller than that of said substrate.

22. The thermo-optic phase shifter comprising:
a substrate;
a heater;
a clad layer provided on said substrate;
a bridge section clad layer formed apart from said substrate and said clad layer in a portion corresponding to said heater; and
a core layer provided inside said bridge section clad layer,
wherein said bridge section clad layer and said core layer form a bridge section optical waveguide in said heater corresponding portion,
said heater is provided inside or outside said bridge section optical waveguide apart from said core layer in said heater corresponding portion, and generates heat to change a phase of a light signal propagated in said bridge section optical waveguide,
said clad layer is formed on said substrate through a sacrifice layer,
said sacrifice layer is formed of material with an etching rate larger than that of said substrate,
said sacrifice layer is formed of the material with a thermal conductivity smaller than that of said substrate, and
said bridge section clad layer has a width wider at both distal ends of said heater corresponding portion than in a center of said heater corresponding portion.

23. The thermo-optic phase shifter according to claim 1, further comprising:
a reinforcing beam provided in grooves between said clad layer and said optical waveguide clad layer on a way of said heater corresponding portion to support said optical waveguide by connecting said clad layer and said optical waveguide clad layer.

24. The thermo-optic phase shifter according to claim 11, wherein said supporting section is formed of a same material as said clad layer.

25. The thermo-optic phase shifter according to claim 11, wherein said supporting section is continuously formed over a full length of said bridge section optical waveguide in a direction in which said core layer extends.

26. The thermo-optic phase shifter according to claim 11, wherein said supporting section is formed in the portion in a direction in which said core layer extends.

27. The thermo-optic phase shifter according to claim 21, wherein said supporting section is formed of a same material as said clad layer.

28. The thermo-optic phase shifter according to claim 21, wherein said supporting section is continuously formed over a full length of said bridge section optical waveguide in a direction in which said core layer extends.

29. The thermo-optic phase shifter according to claim 21, wherein said supporting section is formed in the portion in a direction in which said core layer extends.

30. The thermo-optic phase shifter according to claim 11, wherein said optical waveguide clad layer has a width wider at both distal ends of said heater corresponding portion than in a center of said heater corresponding portion.

31. The thermo-optic phase shifter according to claim 11, further comprising:
a reinforcing beam provided in grooves between said clad layer and said optical waveguide clad layer on a way of said heater corresponding portion to support said optical waveguide by connecting said clad layer and said optical waveguide clad layer.

32. The thermo-optic phase shifter according to claim 21, wherein said optical waveguide clad layer has a width wider at both distal ends of said heater corresponding portion than in a center of said heater corresponding portion.

33. The thermo-optic phase shifter according to claim 21, further comprising:
a reinforcing beam provided in grooves between said clad layer and said optical waveguide clad layer on a way of said heater corresponding portion to support said optical waveguide by connecting said clad layer and said optical waveguide clad layer.

34. The method of manufacturing a thermo-optic phase shifter according to claim 18, wherein said forming an upper clad layer, said forming a core layer and said forming a lower clad layer are carried out by an atmosphere chemical vapor deposition method or a plasma chemical vapor deposition method.

35. The thermo-optic phase shifter of claim 8, wherein said supporting section extends less than a full length of said bridge section optical waveguide in a direction in which said core layer extends.

* * * * *